US012805603B2

(12) United States Patent
Kozuka et al.

(10) Patent No.: US 12,805,603 B2
(45) Date of Patent: Nov. 24, 2026

(54) FOOTWEAR

(71) Applicant: ASICS CORPORATION, Kobe (JP)

(72) Inventors: Yuya Kozuka, Kobe (JP); Shingo Takashima, Kobe (JP); Yuta Kawai, Kobe (JP); Genki Hatano, Kobe (JP); Shigeyuki Mitsui, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

(21) Appl. No.: 19/277,919

(22) Filed: Jul. 23, 2025

(65) Prior Publication Data

US 2026/0026576 A1 Jan. 29, 2026

(30) Foreign Application Priority Data

Jul. 26, 2024 (JP) ................................ 2024-121030

(51) Int. Cl.
*A43B 23/02* (2006.01)
*A43B 23/04* (2006.01)
*B33Y 80/00* (2015.01)

(52) U.S. Cl.
CPC ........ *A43B 23/042* (2013.01); *A43B 23/0215* (2013.01); *B33Y 80/00* (2014.12)

(58) Field of Classification Search
USPC ............................................................ 36/69
See application file for complete search history.

(56) References Cited

U.S. PATENT DOCUMENTS 1,712,420 A * 5/1929 Carlson .................. A43B 23/28 36/55
1,812,622 A * 6/1931 Costello ................. A43B 23/28 36/58.5
2,088,976 A * 8/1937 Resnik ................... A43B 23/08 36/3 R
4,662,088 A * 5/1987 Autry ................... A43B 23/028 36/105

(Continued)

FOREIGN PATENT DOCUMENTS

JP 2022-127292 A 8/2022
JP 2022-127293 A 8/2022

OTHER PUBLICATIONS

The extended European search report issued by the European Patent Office on Nov. 5, 2025, which corresponds to European Patent Application No. 25191776.1-1015 and is related to U.S. Appl. No. 19/277,919.

*Primary Examiner* — Jameson D Collier
(74) *Attorney, Agent, or Firm* — Studebaker Brackett PLLC

(57) ABSTRACT

A footwear includes a shell which is made of an elastic material, the shell including a bottom wall portion and a peripheral wall portion. The peripheral wall portion has a first region that includes a bulging portion bulging toward an insertion space, and a second region which is a portion adjacent to the first region. The bulging portion includes an easy-deformable portion configured of a three-dimensional mesh structure body. The peripheral wall portion includes a cover portion as a hard-deformable portion having higher (Continued)

rigidity than the easy-deformable portion, the cover portion being on a side opposite to a side where the insertion space is located when viewed from the bulging portion and covering at least a portion of the bulging portion by being across the first region and the second region.

10 Claims, 12 Drawing Sheets

(56) References Cited

U.S. PATENT DOCUMENTS

| | | | | |
|---|---|---|---|---|
| 2005/0188562 | A1* | 9/2005 | Clarke | A43B 3/244<br>36/3 R |
| 2011/0185592 | A1* | 8/2011 | Nishiwaki | A43B 23/17<br>36/69 |
| 2012/0023686 | A1* | 2/2012 | Huffa | A43D 3/00<br>12/145 |
| 2014/0173934 | A1* | 6/2014 | Bell | A43C 11/002<br>36/84 |
| 2019/0029369 | A1* | 1/2019 | VanWagnen | B33Y 80/00 |
| 2019/0045884 | A1* | 2/2019 | Uda | A43B 23/0205 |
| 2019/0297999 | A1* | 10/2019 | Nakaya | A43B 23/08 |
| 2021/0259364 | A1 | 8/2021 | Takashima et al. | |
| 2022/0192321 | A1* | 6/2022 | Takamasu | A43B 23/28 |
| 2022/0240625 | A1* | 8/2022 | Shin | A43B 23/028 |
| 2022/0264997 | A1 | 8/2022 | Hatano et al. | |
| 2022/0266561 | A1 | 8/2022 | Wakasugi et al. | |
| 2023/0098661 | A1* | 3/2023 | Suzuki | A43B 1/05<br>36/55 |
| 2023/0147306 | A1* | 5/2023 | Case | A43B 23/028<br>36/45 |
| 2026/0026574 | A1* | 1/2026 | Kozuka | A43B 23/0205 |

* cited by examiner

FOOTWEAR

REFERENCE TO RELATED APPLICATIONS

This nonprovisional application is based on Japanese Patent Application No. 2024-121030 filed on Jul. 26, 2024 with the Japan Patent Office, the entire contents of which are hereby incorporated by reference.

BACKGROUND

Technical Field

The present disclosure relates to a footwear.

Background Information

For example, Japanese Patent Laying-Open No. 2022-127292 and Japanese Patent Laying-Open No. 2022-127293 disclose shoes each including a flexible shell, an upper body having a bag-like shape accommodated inside the shell, and a sole body disposed at a predetermined position inside the shell. In the shoes disclosed in these publications, the flexible shell has a bottom wall portion and a peripheral wall portion, and at the time of wearing, the bottom wall portion supports a sole of a foot of a wearer, while the peripheral wall portion covers a peripheral surface of the foot of the wearer.

SUMMARY

Generally, in a footwear, it is preferable to achieve both fit during low-strength exercise (so-called stationary fit) such as a state in which the wearer is stationary or walking at a low speed and fit during high-strength exercise (so-called dynamic fit) such as a state in which the wearer is walking or running at a high speed.

In this regard, it is conceivable that in the shoes as disclosed in the above publications, in order to improve the stationary fit, the shape of the inner surface of the peripheral wall portion of the shell substantially matches the shape of the peripheral surface of the foot of the wearer so that an appropriate pressure is applied to the peripheral surface of the foot of the wearer. However, such a configuration alone does not necessarily improve the dynamic fit.

That is, the improvement of the dynamic fit is realized only when the shoe deforms in response to the movement of the foot (so-called foot bending motion or the like) while still maintaining the application of an appropriate pressure to the peripheral surface of the foot of the wearer described above even during such deformation. However, it is not necessarily easy to realize this.

Therefore, an object of the present disclosure is to improve the stationary fit and the dynamic fit in a footwear provided with a flexible shell made of an elastic material.

A footwear according to one aspect of the present disclosure includes a shell including an insertion space inside the shell and configured to receive a foot of a wearer, the shell being made of an elastic material, and surrounding the insertion space. The shell includes a bottom wall portion configured to support a sole of the foot of the wearer, and a peripheral wall portion configured to cover a peripheral surface of the foot of the wearer by standing from a peripheral edge of the bottom wall portion. The peripheral wall portion has a first region that includes a bulging portion bulging toward the insertion space, and a second region that is adjacent to the first region. The bulging portion includes an easy-deformable portion configured of a three-dimensional mesh structure body. The peripheral wall portion includes a cover portion as a hard-deformable portion having higher rigidity than the easy-deformable portion, the cover portion being on a side opposite to a side on which the insertion space is located as viewed from the bulging portion and covering at least a portion of the bulging portion by being across the first region and the second region. In the footwear according to one aspect of the present disclosure, at least a portion of the peripheral wall portion including the first region and the second region is configured of a single member.

The foregoing and other objects, features, aspects and advantages of the present invention will become more apparent in view of the following detailed description of the present invention when taken in conjunction with the accompanying drawings.

DETAILED DESCRIPTION

Figure 1:
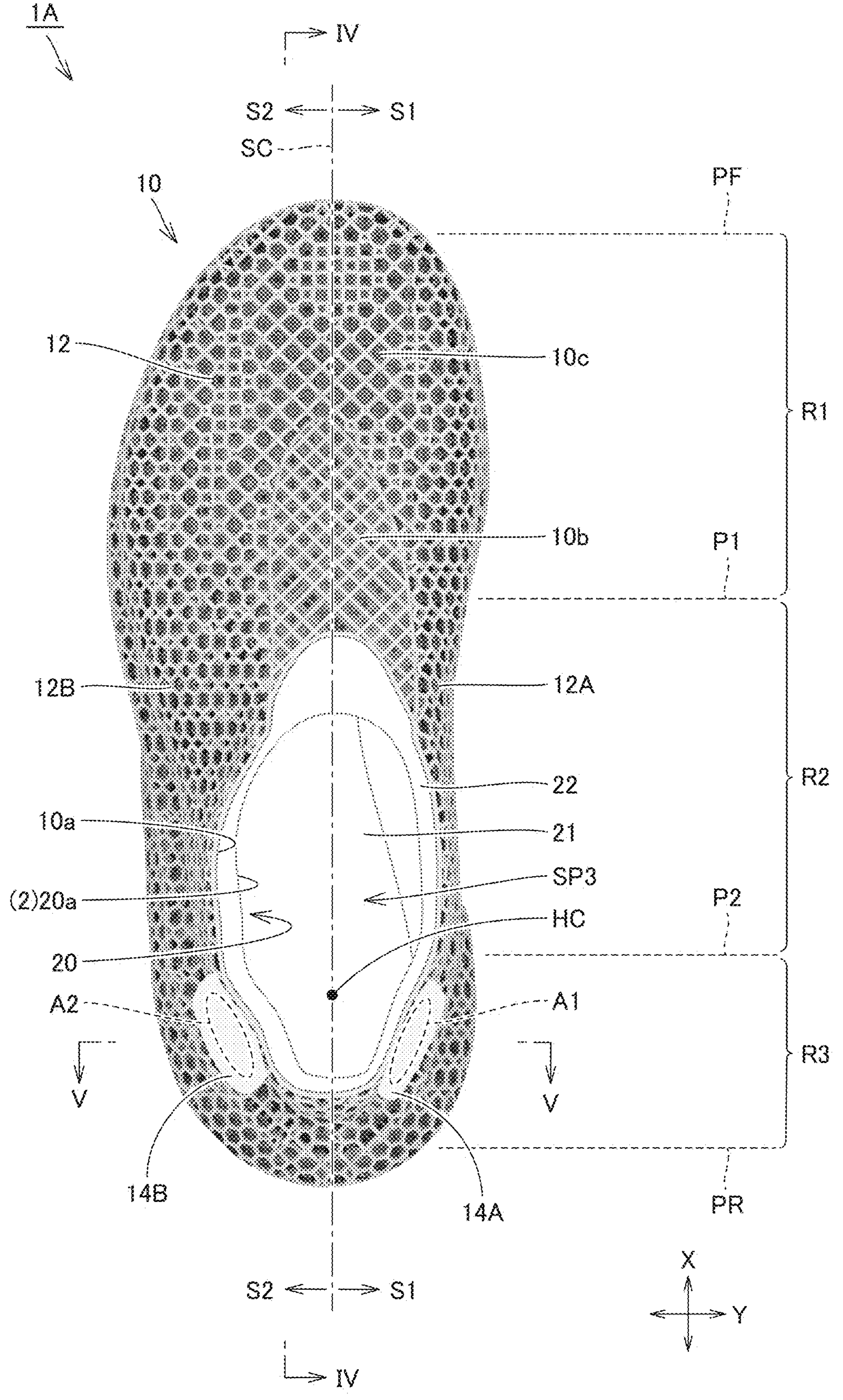
FIG. 1 is a plan view of a shoe according to Embodiment 1.

Hereinafter, embodiments will be described in detail with reference to the drawings. In the embodiment described below, the same or common portions are denoted by the same reference signs in the drawings, and description thereof will not be repeated.

Embodiment 1

<A. Schematic Configuration of Shoe>

Figure 2:
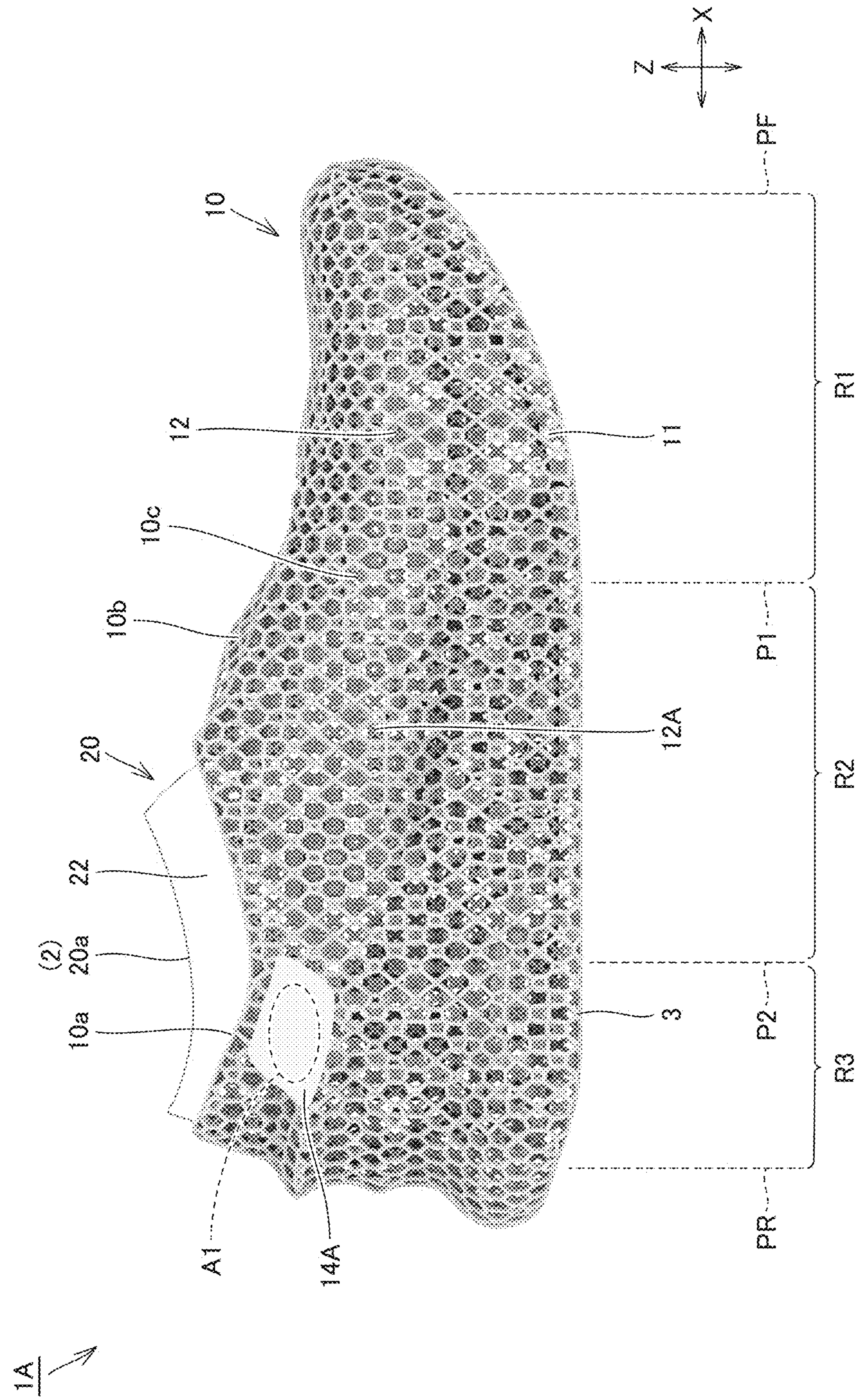
FIG. 2 is a side view of the shoe illustrated in FIG. 1 as viewed from a medial foot side.
Figure 3:
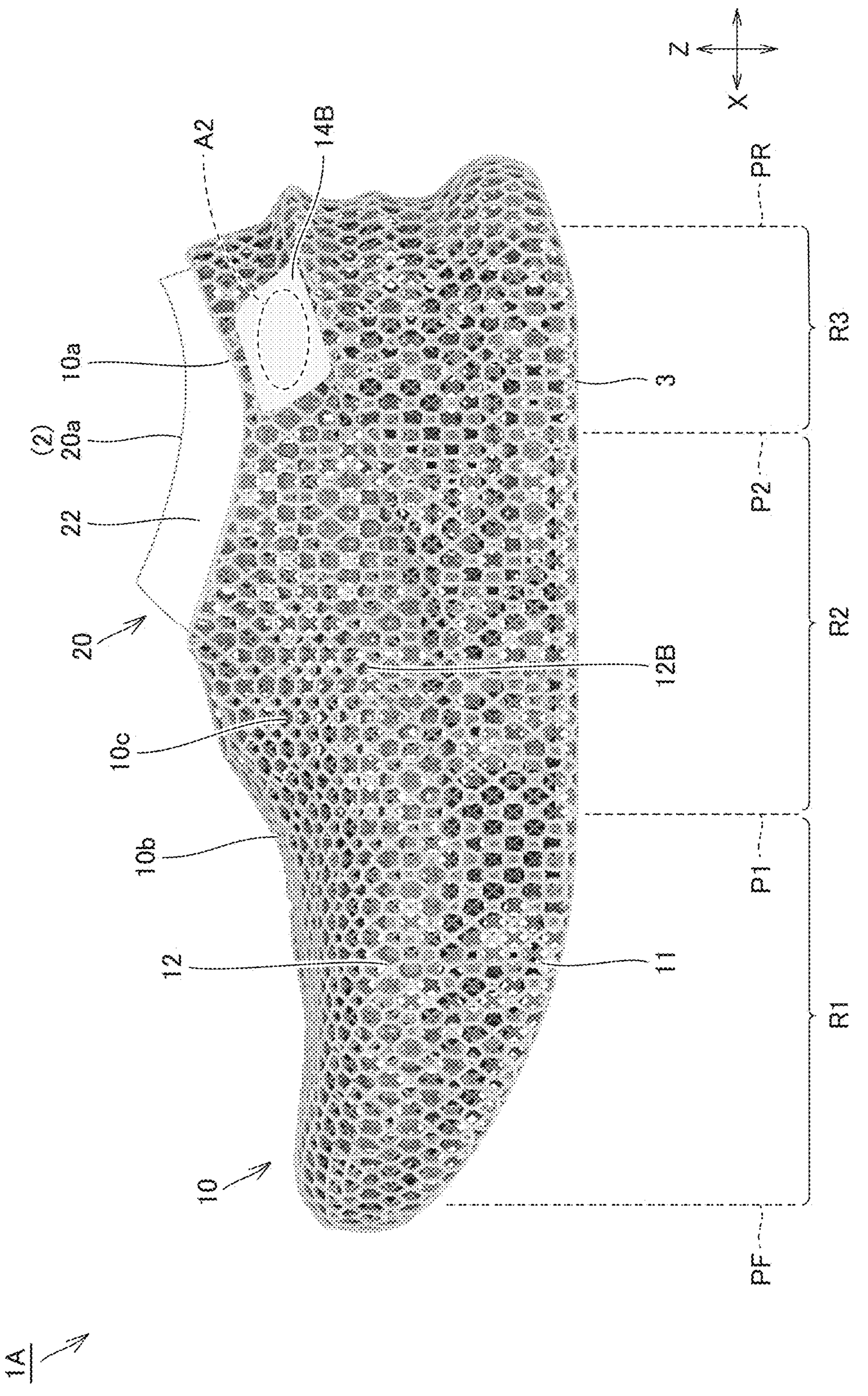
FIG. 3 is a side view of the shoe illustrated in FIG. 1 as viewed from a lateral foot side.
Figure 4:
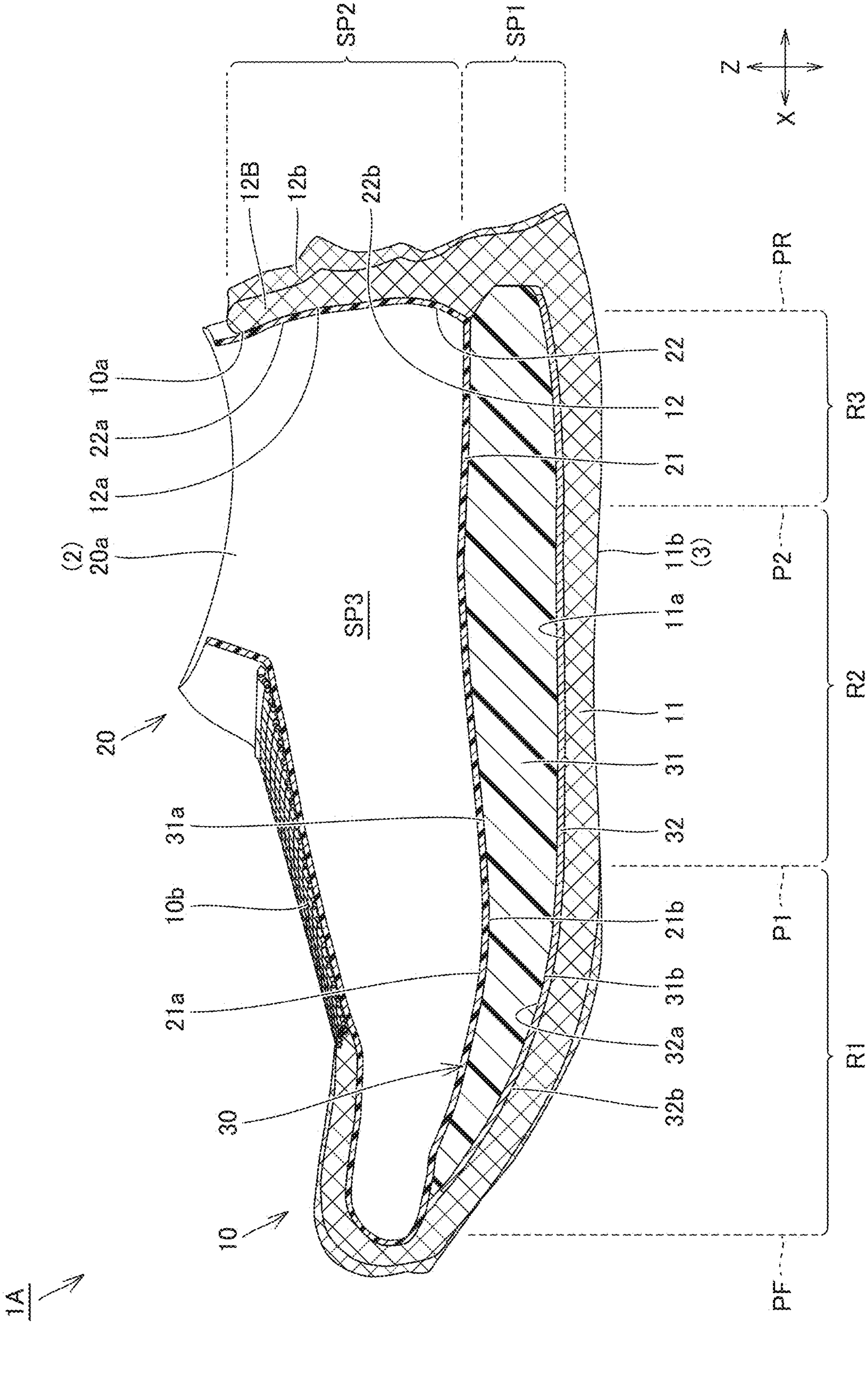
FIG. 4 is a schematic cross-sectional view of the shoe illustrated in FIG. 1 taken along line IV-IV illustrated in FIG. 1.

FIG. 1 is a plan view of a shoe according to Embodiment 1, and FIGS. 2 and 3 are side views of the shoe illustrated in FIG. 1 as viewed from a medial foot side and a lateral foot side, respectively. FIG. 4 is a schematic cross-sectional view of the shoe illustrated in FIG. 1 taken along line IV-IV illustrated in FIG. 1. First, a schematic configuration of a shoe 1A according to the present embodiment will be described with reference to FIGS. 1 to 4.

As illustrated in FIGS. 1 to 4, the shoe 1A according to the present embodiment has a sock shape that covers substantially the entire foot of a wearer (that is, sites on the distal side of the ankle). The shoe 1A includes a shell 10, an upper body 20, and a sole body 30 (see FIG. 4). A topline 2 that is a portion for inserting a foot is provided in an upper portion of the shoe 1A, and a ground contact surface 3 that contacts the ground or the like is provided in a lower portion of the shoe 1A. In addition, an insertion space SP3 (see FIGS. 1 and 4), which is a space into which the foot of the wearer is inserted, is provided inside the shoe 1A.

Here, the front-rear direction X of the shoe 1A is defined as a direction matching the foot length direction of the foot of the wearer wearing the shoe 1A. Furthermore, the left-right direction Y of the shoe 1A is defined as a direction matching the foot width direction of the foot of the wearer wearing the shoe 1A. Furthermore, the up-down direction Z of the shoe 1A is defined as a direction orthogonal to both the front-rear direction X and the left-right direction Y described above. Particularly, the up-down direction Z is substantially orthogonal to the ground contact surface 3 included in a midfoot portion R2 and a rearfoot portion R3 of the shoe 1A to be described later.

As illustrated in FIGS. 1 to 4, the shoe 1A includes, in the front-rear direction X, a forefoot portion R1 configured to support a toe portion and a ball portion of the foot of the wearer, the midfoot portion R2 configured to support an arch portion of the foot of the wearer, and a rearfoot portion R3 configured to support a heel portion of the foot of the wearer.

The forefoot portion R1, the midfoot portion R2, and the rearfoot portion R3 are defined as follows based on a shoe center SC (see FIG. 1) of the shoe 1A. Here, the shoe center SC is a straight line obtained in a case where, when a standard wearer having a foot of a size suitable for the shoe 1A wears the shoe 1A, a straight line connecting a portion between the first toe and the second toe of the wearer and a central portion of a calcaneus (so-called heel center (the heel center is indicated by a reference sign HC in FIG. 1)) is projected on the shoe 1A in the up-down direction Z. The direction in which the shoe center SC extends coincides with the front-rear direction X described above. As a premise, the foremost end and the rearmost end of the insertion space SP3 in the front-rear direction X which are positions on the shoe center SC are referred to as front end position PF and rear end position PR, respectively, and the distance between the front end position PF and the rear end position PR in the front-rear direction X is referred to as the entire length of the insertion space SP3.

That is, when a virtual plane passing through a position of 40% with respect to the entire length of the insertion space SP3 from the front end position PF and orthogonal to the shoe center SC is defined as a first boundary plane P1, and a virtual plane passing through a position of 80% with respect to the entire length of the insertion space SP3 from the front end position PF and orthogonal to the shoe center SC is defined as a second boundary plane P2, the forefoot portion R1 corresponds to a portion included between the front end position PF and the first boundary plane P1 in the front-rear direction X, the midfoot portion R2 corresponds to a portion included between the first boundary plane P1 and the second boundary plane P2 in the front-rear direction X, and the rearfoot portion R3 corresponds to a portion included between the second boundary plane P2 and the rear end position PR in the front-rear direction X.

In addition, as illustrated in FIG. 1, the shoe 1A is divided, in the left-right direction Y in a plan view, into a portion on the medial foot side (a portion on the S1 side illustrated in the drawing) which is the median side (that is, the side close to the median line) in the anatomical normal position of the foot and a portion on the lateral foot side (a portion on the S2 side illustrated in the drawing) which is the side opposite to the median side (that is, the side far from the median line) in the anatomical normal position of the foot.

As illustrated in FIGS. 1 to 4, in the shoe 1A, the upper body 20 and the sole body 30 are accommodated in the shell 10. More specifically, the sole body 30 is disposed at a position below the interior of the shell 10, and the upper body 20 is disposed at a position above the interior of the shell 10 in a manner of being positioned on the sole body 30. Accordingly, the sole body 30 is sandwiched between the shell 10 and the upper body 20. The shell 10, the upper body 20, and the sole body 30 are all located across the forefoot portion R1, the midfoot portion R2, and the rearfoot portion R3.

The shell 10 constitutes the outermost shell of the shoe 1A, and is constituted by a flexible member made of an elastic material formed in a bag-like shape having a mouth portion 10*a* which is opening-shaped. The shell 10 has an internal space leading to the mouth portion 10*a*, and the above-described insertion space SP3 is included in the internal space. As described above, the upper body 20 and the sole body 30 are disposed in the internal space of the shell 10.

The shell 10 includes a bottom wall portion 11 configured to cover the sole of the foot of the wearer and a peripheral wall portion 12 configured to cover the peripheral surface of the foot of the wearer. The peripheral wall portion 12 stands in a manner of continuously extending upward from the peripheral edge of the bottom wall portion 11.

As illustrated in FIG. 4, the bottom wall portion 11 has an inner surface 11*a* and an outer surface 11*b* which are a pair of main surfaces. The inner surface 11*a* is located on the insertion space SP3 side, and the outer surface 11*b* constitutes the outermost surface located on the lower side in the up-down direction Z of the shoe 1A. The outer surface 11*b* of the bottom wall portion 11 corresponds to the above-described ground contact surface 3, whereby the bottom wall portion 11 has the ground contact surface 3.

The peripheral wall portion 12 has an inner peripheral surface 12*a* and an outer peripheral surface 12*b* which are a pair of main surfaces. The inner peripheral surface 12*a* is located on the insertion space SP3 side, and the outer peripheral surface 12*b* constitutes the outermost surface located in the front-rear direction X of the shoe 1A, the outermost surface located in the left-right direction Y of the shoe 1A, and the outermost surface located on the upper side in the up-down direction Z of the shoe 1A.

As illustrated in FIGS. 1 to 4, the peripheral wall portion 12 includes a medial foot side peripheral wall portion 12A configured to cover a portion on the medial foot side of the foot of the wearer and a lateral foot side peripheral wall portion 12B configured to cover a portion on the lateral foot side of the foot of the wearer.

Here, particularly, in the above-described peripheral wall portion 12, a portion configured to cover the instep of the foot of the wearer (that is, a portion of the peripheral wall portion 12 located on the upper side in the up-down direction Z), unlike other portions included in the peripheral wall portion 12, is configured to have a small thickness and is formed of a mesh-like structure portion 10*b* consisting of a plurality of linear portions crossing each other in a direction orthogonal to the thickness direction.

With such a configuration, a portion of the peripheral wall portion 12 configured to cover the instep of the foot of the wearer has a lower tensile elastic modulus and a lower bending rigidity than other portions included in the peripheral wall portion 12. Therefore, the portion can be more flexibly deformed. Therefore, at the time of wearing, it is possible to improve fit while preventing excessive pressure from being applied to the instep of the foot of the wearer (particularly, the ridgeline portion of the instep), and moreover, bending of the shoe 1A at the time of running or walking is less likely to be hindered, and the shoe 1A is more likely to follow the movement of the foot. In addition, the shoe 1A can be put on and taken off more easily.

Note that the portion of the peripheral wall portion 12 configured to cover the instep of the foot of the wearer may include a mesh-like structure portion in which polygons such as triangles and quadrangles are regularly arranged or a mesh-like structure portion in which lines obtained by Voronoi division are traced, in addition to the above-described structure.

The above-described mouth portion 10*a* is provided at the upper end of the peripheral wall portion 12. The mouth portion 10*a* is positioned across the midfoot portion R2 and the rearfoot portion R3. The mouth portion 10*a* is provided corresponding to the topline 2 described above, and the upper body 20 and the sole body 30 are inserted into the shell 10 through the mouth portion 10*a* at the time of manufacturing the shoe 1A, and the like.

As illustrated in FIG. 4, the internal space of the shell 10 is defined by the inner surface 11*a* of the bottom wall portion 11 and the inner peripheral surface 12*a* of the peripheral wall portion 12. The internal space is located across the forefoot portion R1, the midfoot portion R2, and the rearfoot portion R3.

The internal space of the shell 10 is divided into a lower space SP1 located in a lower portion in the up-down direction Z of the shoe 1A and an upper space SP2 located in an upper portion in the up-down direction Z of the shoe 1A. More specifically, the lower space SP1 is a space defined by the inner surface 11*a* of the bottom wall portion 11 and the inner peripheral surface 12*a* of the peripheral wall portion 12 at a portion adjacent to the bottom wall portion 11, and the upper space SP2 is a space defined by the inner peripheral surface 12*a* of a portion of the peripheral wall portion 12 located above the portion adjacent to the bottom wall portion 11 in the up-down direction Z.

That is, the lower space SP1 is located below the inside of the shell 10, and the sole body 30 is accommodated in the lower space SP1 as described above. On the other hand, the upper space SP2 is located above the inside of the shell 10, and the upper body 20 is accommodated in the upper space SP2. The upper space SP2 further includes the insertion space SP3 described above. The insertion space SP3 is defined by a space inside the upper body 20.

Here, in the shoe 1A according to the present embodiment, almost all of the portions of the shell 10 excluding the above-described mesh-like structure portion 10*b* are each formed of a three-dimensional mesh structure body. Here, the three-dimensional mesh structure body is formed by repeatedly arranging a plurality of predetermined unit structures in a manner of being adjacent to each other, and the three-dimensional mesh structure body includes those having a three-dimensional lattice structure and those having a three-dimensional wall structure.

The three-dimensional lattice structure is a structure in which a plurality of unit structures formed by connecting a plurality of columns extending in a predetermined direction is repeatedly arranged in a manner of being adjacent to each other. The unit structure of the three-dimensional lattice structure is not particularly limited, and for example, a rectangular parallelepiped lattice, a diamond lattice, an octahedral lattice, a double pyramid lattice, a dodecahedral lattice, or a lattice obtained by adding various columnar supports to these lattices can be used.

The three-dimensional wall structure is a structure in which a plurality of unit structures formed by walls whose outer shapes are defined by a pair of parallel curved surfaces or planes is repeatedly arranged in a manner of being adjacent to each other. The unit structure of the three-dimensional wall structure is not particularly limited, and for example, a Schwartz P structure, a gyroid structure, a Schwartz D structure, an octet structure, a cubic structure, a Kelvin structure, or a dodecahedron structure can be used.

Thus, in a case where the shell 10 includes a three-dimensional mesh structure body, as illustrated in FIGS. 1 to 4, an infinite number of holes 10*c* are formed in a manner of reaching the inner surface (that is, the inner surface 11*a* of the bottom wall portion 11 and the inner peripheral surface 12*a* of the peripheral wall portion 12) and the outer surface (that is, the outer surface 11*b* of the bottom wall portion 11 and the outer peripheral surface 12*b* of the peripheral wall portion 12) of the shell 10. The shell 10 having such a structure can be manufactured relatively easily, particularly by a three-dimensional additive manufacturing method.

By being configured in this manner, the shell 10 is provided with sufficient strength while also maintaining appropriate flexibility, thereby achieving both weight reduction and improved ventilation of the shoe 1A. In addition, since the upper body 20 accommodated in the internal space of the shell 10 can be visually recognized from the outside through the infinite number of holes 10*c*, the designability thereof is also improved.

Note that, in the shell 10 included in the shoe 1A according to the present embodiment, a three-dimensional mesh structure body having a three-dimensional lattice structure is used, but as described above, a three-dimensional mesh structure body having a three-dimensional wall structure may also be used. Furthermore, a portion of the shell 10 may have a three-dimensional lattice structure, and another portion of the shell 10 may have a three-dimensional wall structure.

As illustrated in FIGS. 1 to 4, the upper body 20 constitutes a portion in contact with the foot of the wearer of the shoe 1A, and is formed of a bag-shaped member provided with an opening portion 20*a*. The upper body 20 is formed of a member that can be flexibly deformed from the viewpoint of improving fit and ensuring excellent wearing comfort.

The upper body 20 includes a lower wall portion 21 configured to cover the sole of the foot of the wearer, and a side wall portion 22 configured to cover the peripheral surface of the foot of the wearer. The side wall portion 22 stands in a manner of continuously extending upward from the peripheral edge of the lower wall portion 21.

The lower wall portion 21 extends along an upper surface (more specifically, a top surface 31*a* of a midsole 31 to be described later) to be described later of the sole body 30, and the side wall portion 22 extends along the inner peripheral surface 12*a* of the peripheral wall portion 12 of the shell 10.

As illustrated in FIG. 4, the lower wall portion 21 has an inner surface 21*a* and an outer surface 21*b* which are a pair of main surfaces. The inner surface 21*a* is located on the insertion space SP3 side, and the outer surface 21*b* is located on the sole body 30 side (that is, the bottom wall portion 11 side of the shell 10).

The side wall portion 22 has an inner peripheral surface 22*a* and an outer peripheral surface 22*b* which are a pair of main surfaces. The inner peripheral surface 22*a* is located on the insertion space SP3 side, and the outer peripheral surface 22*b* is located on the peripheral wall portion 12 side of the shell 10.

As illustrated in FIGS. 1 to 4, the opening portion 20*a* described above is provided at the upper end of the side wall portion 22. The opening portion 20*a* is located across the midfoot portion R2 and the rearfoot portion R3. The opening portion 20*a* corresponds to the topline 2 described above, and the foot of the wearer is inserted into the insertion space SP3 through the opening portion 20*a* at the time of wearing. The upper end portion of the side wall portion 22 of the portion defining the opening portion 20*a* is positioned in a manner of protruding upward in the up-down direction Z from the mouth portion 10*a* of the shell 10. Thus, it is possible to avoid direct contact of the shell 10 with the ankle of the wearer at the time of wearing, and it is possible to ensure excellent wearing comfort.

As illustrated in FIG. 4, the sole body 30 includes the midsole 31 as a shock absorber and a plate 32 as a resilient member. The midsole 31 and the plate 32 are laminated in the up-down direction Z in a manner that the midsole 31 is positioned above the plate 32.

The midsole 31 supports the sole of the foot of the wearer, and has a substantially plate-like flat shape. The midsole 31 has the top surface 31*a* and a bottom surface 31*b*, which are a pair of main surfaces, and side end surfaces connecting the top surface 31*a* and the bottom surface 31*b*. The midsole 31 is formed of an elastically deformable member having a predetermined thickness so as to obtain desired cushioning performance at the time of foot landing or the like.

Here, the top surface 31*a* of the midsole 31 may be configured to have an uneven shape corresponding to the sole shape of the foot of the wearer from the viewpoint of suppressing falling of the ankle of the wearer (so-called pronation) or crushing of the arch of the foot of the wearer, which may occur at the time of foot landing.

The plate 32 has a first main surface 32*a* and a second main surface 32*b*, which are a pair of main surfaces located in the thickness direction, and a peripheral end surface connecting the first main surface 32*a* and the second main surface 32*b*. The first main surface 32*a* faces upward in the up-down direction Z, and the second main surface 32*b* faces downward in the up-down direction Z. The plate 32 is formed of a hard member having a thickness smaller than that of the midsole 31 so as to obtain desired resilience performance at the time of take-off or the like.

As described above, the sole body 30 is configured by laminating the midsole 31 and the plate 32, and the bottom surface 31*b* of the midsole 31 is in contact with the first main surface 32*a* of the plate 32. The midsole 31 and the plate 32 may be joined by, for example, an adhesive, but from the viewpoint of reducing the amount of organic solvent used, it is preferable that the midsole 31 and the plate 32 are not joined.

The sole body 30 has an upper surface defined by the top surface 31*a* of the midsole 31, a lower surface defined by the second main surface 32*b* of the plate 32, and a peripheral surface defined by the side end surface of the midsole 31 and the peripheral end surface of the plate 32. The upper surface of the sole body 30 is covered with the lower wall portion 21 of the upper body 20. On the other hand, the peripheral surface and the lower surface of the sole body 30 face the peripheral wall portion 12 and the bottom wall portion 11 of the shell 10, respectively.

In the shoe 1A according to the present embodiment described above, the sole and the peripheral surface of the foot of the wearer are covered with the upper body 20. Therefore, in a state where the wearer wears the shoe 1A, the foot of the wearer is in contact with the soft upper body 20 that can be flexibly deformed, and the shell 10 does not directly contact the foot of the wearer, and thus, it is possible to obtain a shoe that can ensure excellent wearing comfort.

Furthermore, in the shoe 1A according to the present embodiment, the sole of the foot of the wearer is configured to be supported by the sole body 30 including the midsole 31 and the plate 32 via the upper body 20. Therefore, it is possible not only to suppress the impact at the time of foot landing from being applied to the foot of the wearer, but also to provide a shoe capable of obtaining a high propulsive force at the time of running.

Here, the upper body 20 does not necessarily have to entirely come into contact with the foot of the wearer, and the upper body 20 may be provided with a cutout or opening-shaped missing portion or the like as long as the wearing comfort is not impaired.

<B. Material of Each Member>

Next, a material of each member described above will be described. Note that the specific materials described below are merely examples, and are not limited thereto.

The shell 10 is made of an elastic material, preferably a resin material or a rubber material. More specifically, when the shell 10 is made of resin, it can be made of, for example, polyolefin resin, ethylene-vinyl acetate copolymer (EVA), polyamide thermoplastic elastomer (TPA, TPAE), thermoplastic polyurethane (TPU), or polyester thermoplastic elastomer (TPEE). On the other hand, when the shell 10 is made of rubber, it can be made of, for example, butadiene rubber.

The shell 10 can also be made of a polymer composition. In that case, examples of polymers contained in the polymer composition include olefin polymers such as olefin elastomers and olefin resins. Examples of olefin polymers include polyolefins such as polyethylene (e.g., linear low-density polyethylene (LLDPE), high-density polyethylene (HDPE), etc.), polypropylene, ethylene-propylene copolymers, propylene-1-hexene copolymers, propylene-4-methyl-1-pentene copolymers, propylene-1-butene copolymers, ethylene-1-hexene copolymers, ethylene-4-methyl-pentene copolymers, ethylene-1-butene copolymers, 1-butene-1-hexene copolymers, 1-butene-4-methyl-pentene, ethylenemethacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers (EVA), and propylene-vinyl acetate copolymers.

The above polymers may also be amide polymers such as amide elastomers and amide resins. Examples of the amide polymer include polyamide 6, polyamide 11, polyamide 12, polyamide 66, polyamide 610, and polyether block amide (PEBA).

Additionally, the above polymers may be ester polymers such as ester elastomers and ester resins. Examples of ester polymers include polyethylene terephthalate, polybutylene terephthalate.

Furthermore, the above polymers may be urethane polymers such as urethane elastomers and urethane resins. Examples of the urethane polymer include polyester polyurethanes and polyether polyurethanes, and particularly, urethane acrylates can be suitably used.

Moreover, the above polymers may be styrene polymers such as styrene elastomers and styrene resins. Examples of styrene elastomers include styrene-ethylene-butylene copolymers (SEB), styrene-butadiene-styrene copolymers (SBS), hydrogenated SBS (styrene-ethylene-butylene-styrene copolymers (SEBS)), styrene-isoprene-styrene copolymers (SIS), hydrogenated SIS (styrene-ethylene-propylene-styrene copolymers (SEPS)), styrene-isobutylene-styrene copolymers (SIBS), styrene-butadiene-styrene-butadiene (SBSB), and styrene-butadiene-styrene-butadiene-styrene (SBSBS). Examples of styrene resins include polystyrene, acrylonitrile-styrene resin (AS), acrylonitrile-butadiene-styrene resin (ABS).

Additionally, the above polymers may be, for example, acrylic polymers such as polymethyl methacrylate, urethane acrylic polymers, polyester acrylic polymers, polyether acrylic polymers, polycarbonate acrylic polymers, epoxy acrylic polymers, conjugated diene polymer acrylic polymers and the hydrogenated products thereof, urethane methacrylic polymers, polyester methacrylic polymers, polyether methacrylic polymers, polycarbonate methacrylic polymers, epoxy methacrylic polymers, conjugated diene polymer methacrylic polymers and the hydrogenated products thereof, polyvinyl chloride resins, silicone elastomers, butadiene rubber (BR), isoprene rubber (IR), chloroprene rubber (CR), natural rubber (NR), styrene-butadiene rubber (SBR), acrylonitrile-butadiene rubber (NBR), butyl rubber (IIR).

A method of manufacturing the shell 10 is not particularly limited, and the shell 10 can be manufactured by, for example, three-dimensional additive manufacturing. Here, even when the shell 10 is manufactured by three-dimensional additive manufacturing, the manufacturing method is not particularly limited, and a fused additive manufacturing method, a stereolithography manufacturing method, or a powder sintering additive manufacturing method can be suitably used.

The upper body 20 may be basically made of any material as long as it can be flexibly deformed, and preferably, a woven fabric, a knitted fabric, a nonwoven fabric, a synthetic leather, a resin, or the like is used. More specifically, the upper body 20 can be made of, for example, natural fibers such as cotton, hemp, and silk, and can be made of, for example, synthetic fibers made of a polyamide resin such as nylon, a polyester resin, a polyurethane resin, a polyvinyl alcohol resin such as vinylon, a polyacrylonitrile resin such as exlan and cashmilon, a polyvinyl chloride resin such as teviron and environ, a polypropylene resin such as pyrene, a polyethylene resin, a polystyrene resin, or the like. The upper body 20 can be made of, for example, rayon or cupra as regenerated fibers.

Particularly, as described later, if a woven fabric, a knitted fabric, a nonwoven fabric, or the like made of a synthetic fiber having heat shrinkability is used in a portion of the upper body 20, the upper body 20 that better fits the foot of the wearer can be obtained. Examples of the synthetic fiber having heat shrinkability include those containing a polyester resin, a polyurethane resin, or the like as a main component, and Hytrel (trademark), which is a kind of polyester resin, is particularly preferable.

That is, in a case where a portion of the upper body 20 is made of a woven fabric, a knitted fabric, a nonwoven fabric, or the like of a synthetic fiber having heat shrinkability, the upper body 20 is formed in a bag shape in advance, and heat treatment is performed in a state where a last is inserted into the upper body 20, and thus, heat shrinkage occurs due to heating, whereby a shape change occurs in a state where the portion of the upper body 20 is in close contact with the last, and the shape after the change is maintained. Therefore, by preparing a last corresponding to the shape of the wearer's foot and using it to shape the upper body 20 described above, the upper body 20 that fits the wearer's foot can be manufactured. Furthermore, by performing the heat treatment using the above-described last with the upper body 20 assembled into the shell 10, the upper body 20 will also fit the shell 10, thereby further improving the fit.

Here, a portion of the upper body 20 that can be made of a woven fabric, a knitted fabric, a nonwoven fabric, or the like of a synthetic fiber having heat shrinkability is the side wall portion 22 described above. The side wall portion 22 is a portion which is in contact with the peripheral surface of the foot of the wearer.

As the last described above, a last having a standard shape corresponding to the size of the foot of the wearer may be used, and if a last manufactured based on the shape data of the foot obtained by measuring the actual foot of the wearer is used, the fit of the manufactured shoe 1A to the foot of the wearer is remarkably improved.

The midsole 31 may be basically made of any material as long as it can be elastically deformed, and is preferably made of a member having an appropriate strength and excellent cushioning. From this viewpoint, the midsole 31 uses, for example, a resin foam material containing a resin material as the main component and a foaming agent and a crosslinking agent as secondary components. Alternatively, a rubber foam material containing a rubber material as a main component and a plasticizer, a foaming agent, a reinforcing agent, and a crosslinking agent as secondary components may be used.

Particularly preferably, the midsole 31 can be made of a foam material such as a polyolefin resin, an ethylene-vinyl acetate copolymer (EVA), a polyamide thermoplastic elastomer (TPA, TPAE), a thermoplastic polyurethane (TPU), or a polyester thermoplastic elastomer (TPEE). Note that the midsole 31 is not necessarily made of a foam material, and may be made of a non-foam material.

The material of the plate 32 is not particularly limited as long as the material of the plate 32 is harder than the material of the midsole 31. Examples of the material of the plate 32 include a fiber-reinforced resin using carbon fibers, glass fibers, aramid fibers, Dyneema fibers (registered trademark), ZYLON fibers (registered trademark), boron fibers, or the like as reinforcing fibers and an epoxy resin, a polyester resin, a phenol resin, a polyamide resin, a polypropylene resin, a polyethylene resin, a polyurethane resin, or the like as a base material, and a non-fiber-reinforced resin made of a polymer resin such as a urethane thermoplastic elastomer (TPU), an amide thermoplastic elastomer (TPA), or an ethylene-vinyl acetate copolymer (EVA).

<C. Configuration of Shell of Portion Corresponding to Vicinity of Medial and Lateral Malleoli of Foot of Wearer>

Figure 5:
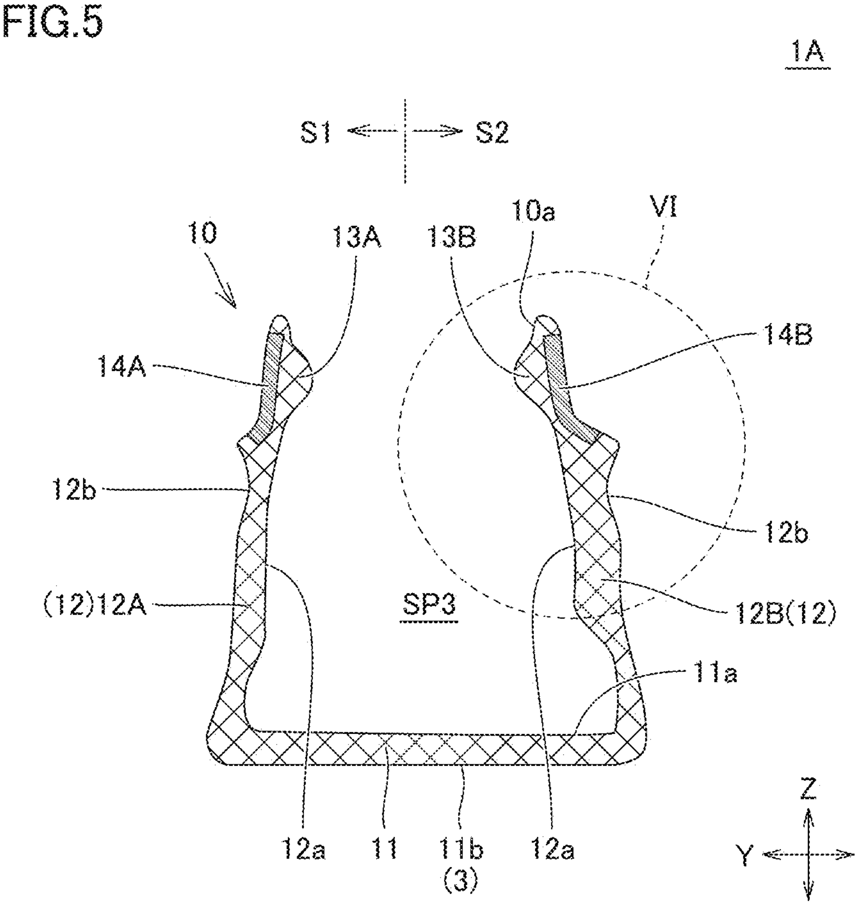
FIG. 5 is a schematic cross-sectional view of a shell included in the shoe illustrated in FIG. 1 taken along line V-V illustrated in FIG. 1.
Figure 6:
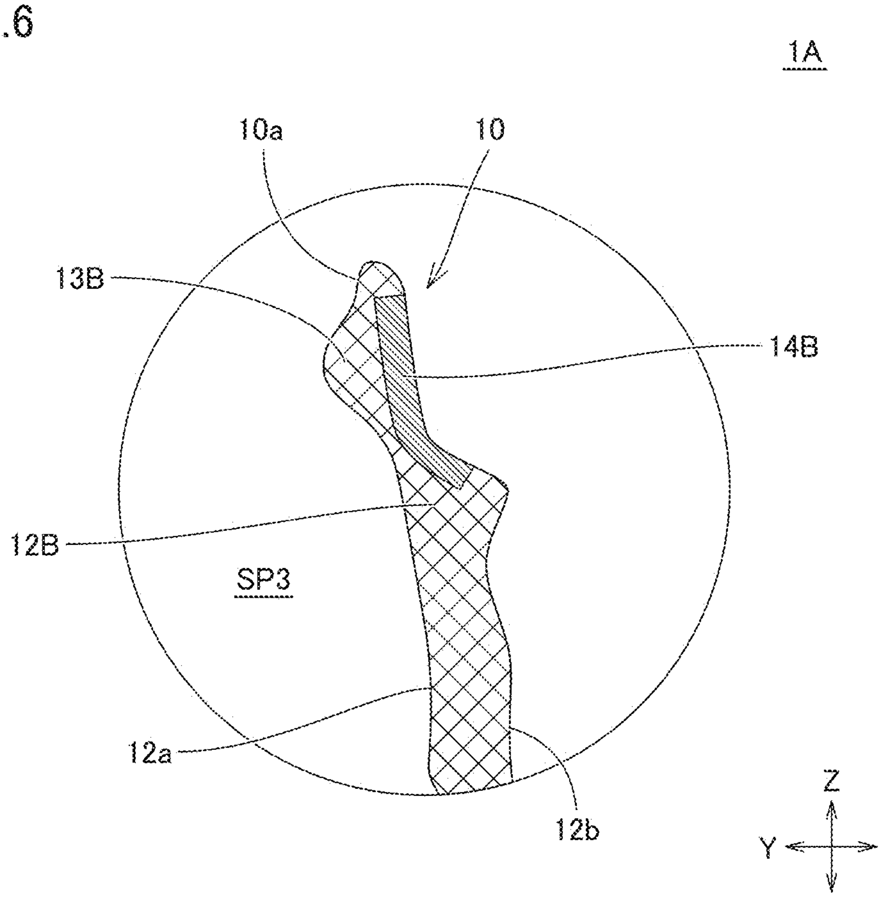
FIG. 6 is an enlarged view of a region VI illustrated in FIG. 5.
Figure 7:
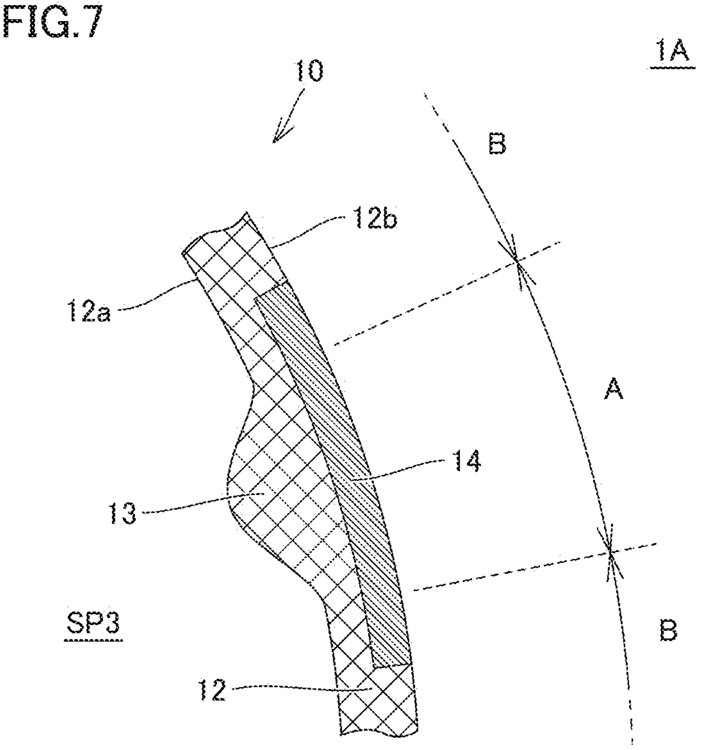
FIG. 7 is a schematic cross-sectional view for illustrating a configuration of a shell of a portion corresponding to a vicinity of medial and lateral malleoli of a foot of a wearer in the shoe illustrated in FIG. 1.

FIG. 5 is a schematic cross-sectional view of the shell included in the shoe illustrated in FIG. 1 taken along line V-V illustrated in FIG. 1, and FIG. 6 is an enlarged view of a region VI illustrated in FIG. 5. In addition, FIG. 7 is a schematic cross-sectional view illustrating a simplified configuration of the shell without distinguishing the medial foot side and the lateral foot side in order to facilitate understanding when describing the configuration of the shell of the portion corresponding to the vicinity of the medial and lateral malleoli of the foot of the wearer in the shoe illustrated in FIG. 1. Next, with reference to FIGS. 5 to 7 and FIGS. 1 to 4 described above, the configuration of the portion of the shell 10 included in the shoe 1A according to the present embodiment corresponding to the vicinity of the medial and lateral malleoli of the foot of the wearer will be described in detail.

Since a portion of the peripheral surface of the foot of the wearer, the portion being located behind the medial and lateral malleoli, is recessed more greatly than the surrounding portion, it is difficult to enhance the dynamic fit in the portion. In order to solve this problem, as an example, it is conceivable to configure the portion of the shell by combining a plurality of members having different elastic moduli.

However, in the case of such a configuration, not only a problem that the manufacturing cost increases with an increase in the number of components and complication of assembly work occurs, but also use of an adhesive is unavoidable in order to fix a plurality of members to each other, and the adhesive contains an appropriate amount of an organic solvent, and thus, the configuration cannot be necessarily preferable from the viewpoint of environmental load.

Furthermore, in a case where the outer shell of the shoe is configured by the shell made of the elastic material as in the present embodiment, the shell is manufactured by three-dimensional additive manufacturing in many cases as described above, and thus, from the viewpoint of improving manufacturing efficiency, it is preferable that at least a portion of the shell corresponding to the vicinity of the medial and lateral malleoli of the foot of the wearer consists of a single member (that is, not a composite component obtained by combining a plurality of components, but one component), and it is necessary to improve dynamic fit in the portion on the premise of these points.

In this regard, the shoe 1A according to the present embodiment improves the stationary fit by providing a medial foot side bulging portion 13A and a lateral foot side bulging portion 13B to be described later at the portions located behind the medial and lateral malleoli of the peripheral surface of the foot of the wearer, respectively, and further improves the dynamic fit by providing characteristic configurations respectively to the medial foot side peripheral wall portion 12A and the lateral foot side peripheral wall portion 12B in the vicinity of the portions where the medial foot side bulging portion 13A and the lateral foot side bulging portion 13B are provided.

As illustrated in FIG. 5, the medial foot side bulging portion 13A bulging toward the insertion space SP3 is provided at a position of the medial foot side peripheral wall portion 12A corresponding to a portion behind the medial malleolus point of the foot of the wearer (a region denoted by a reference sign A1 in FIGS. 1 and 2 corresponds to the position of the medial foot side peripheral wall portion 12A corresponding to the portion behind the medial malleolus point of the foot of the wearer). The medial foot side bulging portion 13A is formed of a three-dimensional mesh structure body.

The medial foot side bulging portion 13A is configured to have a shape along a recess existing in a portion located behind the medial malleolus of the peripheral surface of the foot of the wearer, thereby reducing a gap between the recess and the medial foot side peripheral wall portion 12A. Therefore, by providing the medial foot side bulging portion 13A in the medial foot side peripheral wall portion 12A, the fit at the time of wearing is improved.

Furthermore, since the medial foot side bulging portion 13A is formed of the three-dimensional mesh structure body as described above, the occupied volume ratio per unit volume is low, and the density is also low accordingly, and thus, the medial foot side bulging portion 13A functions as an easy-deformable portion. Therefore, when the medial foot side bulging portion 13A comes into contact with the foot of the wearer at the time of wearing, the medial foot side bulging portion 13A is compressed and deformed, thereby applying an appropriate pressure to the surface of the above-described recessed portion of the foot of the wearer by the reaction force of the compressive deformation, and thus, the stationary fit in the portion is enhanced.

Here, it is preferable that the medial foot side bulging portion 13A is configured in a manner that a surface shape of the medial foot side bulging portion 13A is smoothly curved in order to reduce application of excessive pressure to the foot of the wearer and improve foot contact, but the medial foot side bulging portion 13A may partially include a portion on a plane. The dimensions of the medial foot side bulging portion 13A are not particularly limited, but the height is preferably greater than or equal to 3 mm and less than or equal to 10 mm, and the width in the up-down direction Z is preferably greater than or equal to 5 mm and less than or equal to 30 mm. The compression rigidity of the medial foot side bulging portion 13A is preferably less than or equal to 1 MPa on condition that the compression rigidity of the medial foot side bulging portion 13A is lower than the compression rigidity of a medial foot side cover portion 14A to be described later.

It is preferable that the three-dimensional mesh structure body formed of the three-dimensional lattice structure constituting the medial foot side bulging portion 13A has a structure in which the compression rigidity is low in the thickness direction of the medial foot side peripheral wall portion 12A of the portion where the medial foot side bulging portion 13A is provided, which is the compressive direction (the compression direction substantially coincides with the left-right direction Y), and the tensile rigidity is high in the direction orthogonal to the thickness direction. As an example of the structure, it is conceivable to adopt a three-dimensional lattice structure including a flat unit structure in which the dimension in the thickness direction of the medial foot side peripheral wall portion 12A of the unit structure included in the three-dimensional lattice structure is smaller than the dimension of the unit structure in the direction orthogonal to the thickness direction.

From the viewpoint of reducing the compression rigidity of the medial foot side bulging portion 13A, the columns of the three-dimensional lattice structure of the portion included in the medial foot side bulging portion 13A may be made thinner than the columns of the three-dimensional lattice structure of the portion of the medial foot side peripheral wall portion 12A not including the medial foot side bulging portion 13A. In this way, only the rigidity of the medial foot side bulging portion 13A can be locally suppressed low.

The medial foot side bulging portion 13A may be formed of a spot-shaped protrusion, or may be formed of a rib protrusion extending in a predetermined direction. Thus, it is preferable that in a case where the medial foot side bulging portion 13A is formed of the ridge protrusion extending in the predetermined direction, the extending direction is configured to follow the contour line of the medial malleolus of the foot of the wearer.

As illustrated in FIGS. 5 and 6, the lateral foot side bulging portion 13B bulging toward the insertion space SP3 is provided at a position of the lateral foot side peripheral wall portion 12B corresponding to a portion behind the lateral malleolus point of the foot of the wearer (a region denoted by a reference sign A2 in FIGS. 1 and 3 corresponds to the position of the lateral foot side peripheral wall portion 12B corresponding to the portion behind the lateral malleolus point of the foot of the wearer). The lateral foot side bulging portion 13B is formed of a three-dimensional mesh structure body.

The lateral foot side bulging portion 13B is configured to have a shape along a recess existing in a portion located behind the lateral malleolus of the peripheral surface of the foot of the wearer, thereby reducing a gap between the recess and the lateral foot side peripheral wall portion 12B. Therefore, by providing the lateral foot side bulging portion 13B in the lateral foot side peripheral wall portion 12B, the fit at the time of wearing is improved.

Furthermore, since the lateral foot side bulging portion 13B is formed of the three-dimensional mesh structure body as described above, the occupied volume ratio per unit volume is low, and the density is also low accordingly, and thus, the lateral foot side bulging portion 13B functions as an easy-deformable portion. Therefore, when the lateral foot side bulging portion 13B comes into contact with the foot of the wearer at the time of wearing, the lateral foot side bulging portion 13B is compressed and deformed, thereby applying an appropriate pressure to the surface of the above-described recessed portion of the foot of the wearer by the reaction force of the compressive deformation, and thus, the stationary fit in the portion is enhanced.

Here, it is preferable that the lateral foot side bulging portion 13B is configured in a manner that a surface shape of the lateral foot side bulging portion 13B is smoothly curved in order to reduce application of excessive pressure to the foot of the wearer and improve foot contact, but the lateral foot side bulging portion 13B may partially include a portion on a plane. The dimensions of the lateral foot side bulging portion 13B are not particularly limited, but the height is preferably greater than or equal to 3 mm and less than or equal to 10 mm, and the width in the up-down direction Z is preferably greater than or equal to 5 mm and less than or equal to 30 mm. The compression rigidity of the lateral foot side bulging portion 13B is preferably less than or equal to 1 MPa on condition that the compression rigidity of the lateral foot side bulging portion 13B is lower than the compression rigidity of a lateral foot side cover portion 14B to be described later.

It is preferable that the three-dimensional mesh structure body formed of the three-dimensional lattice structure constituting the lateral foot side bulging portion 13B has a structure in which the compression rigidity is low in the thickness direction of the lateral foot side peripheral wall portion 12B of the portion where the lateral foot side bulging portion 13B is provided, which is the compressive direction (the compression direction substantially coincides with the left-right direction Y), and the tensile rigidity is high in the direction orthogonal to the thickness direction. As an example of the structure, it is conceivable to adopt a three-dimensional lattice structure including a flat unit structure in which the dimension in the thickness direction of the lateral foot side peripheral wall portion 12B of the unit structure included in the three-dimensional lattice structure is smaller than the dimension of the unit structure in the direction orthogonal to the thickness direction.

From the viewpoint of reducing the compression rigidity of the lateral foot side bulging portion 13B, the columns of the three-dimensional lattice structure of the portion included in the lateral foot side bulging portion 13B may be made thinner than the columns of the three-dimensional lattice structure of the portion of the lateral foot side peripheral wall portion 12B not including the lateral foot side bulging portion 13B. In this way, only the rigidity of the lateral foot side bulging portion 13B can be locally suppressed low.

The lateral foot side bulging portion 13B may be formed of a spot-shaped protrusion, or may be formed of a rib protrusion extending in a predetermined direction. Thus, it is preferable that in a case where the lateral foot side bulging portion 13B is formed of the ridge protrusion extending in the predetermined direction, the extending direction is configured to follow the contour line of the lateral malleolus of the foot of the wearer.

Here, as illustrated in FIGS. 1 to 3 and FIGS. 5 and 6, in the shoe 1A according to the present embodiment, the medial foot side cover portion 14A and the lateral foot side cover portion 14B as hard-deformable portions are respectively provided in the vicinity of the portion of the medial foot side peripheral wall portion 12A where the medial foot side bulging portion 13A is provided and in the vicinity of the portion of the lateral foot side peripheral wall portion 12B where the lateral foot side bulging portion 13B is provided. Since the medial foot side cover portion 14A and the lateral foot side cover portion 14B basically have the same configuration, the medial foot side cover portion 14A and the lateral foot side cover portion 14B will be described below with reference to FIG. 7 without being distinguished from each other.

As illustrated in FIG. 7, the peripheral wall portion 12 in the vicinity of the portion where a bulging portion 13 is provided is divided into a bulging portion forming region A, which serves as a first region, where the bulging portion 13 is provided and an adjacent region B which serves as a second region and is adjacent to the bulging portion forming region A. The bulging portion forming region A is surrounded by the adjacent region B.

The peripheral wall portion 12 is provided with a cover portion 14. The cover portion 14 is located on the outer surface (that is, the outer peripheral surface 12*b*) of the peripheral wall portion 12, whereby the cover portion 14 is disposed on the side opposite to the side where the insertion space SP3 is located when viewed from the bulging portion 13. Accordingly, the end surface of the cover portion 14 located on the insertion space SP3 side is covered with the three-dimensional mesh structure body constituting the peripheral wall portion 12, and the end surface of the cover portion 14 located on the side opposite to the insertion space SP3 is exposed on the outer peripheral surface 12*b* of the peripheral wall portion 12.

The cover portion 14 is provided across the bulging portion forming region A and the adjacent region B. Accordingly, the bulging portion 13 is covered with the cover portion 14. In the shoe 1A according to the present embodiment, as illustrated in FIGS. 1 to 3, when viewed in the normal direction of the outer peripheral surface 12*b* of the peripheral wall portion 12, the cover portion 14 is disposed in a manner of overlapping the entire region of the bulging portion forming region A, and is further disposed in a manner of overlapping the entire periphery of a portion of the peripheral wall portion 12 adjacent to the bulging portion forming region A.

The cover portion 14 is for enhancing the bending rigidity of the peripheral wall portion 12 (particularly, the portion of the peripheral wall portion 12 where the bulging portion 13 is provided and the vicinity thereof), and is formed of a solid structure. That is, the cover portion 14 formed of a solid structure has a high occupied volume ratio per unit volume and accordingly has a high density, and thus functions as a hard-deformable portion. Therefore, the cover portion 14 can serve as a pressing portion that prevents uplift of the peripheral wall portion 12 at the portion where the bulging portion 13 is provided.

Here, as described above, the portion of the peripheral wall portion 12 where the bulging portion 13 is provided exhibits an effect of improving fit by reducing the gap between the foot of the wearer and the peripheral wall portion 12 at the time of wearing. However, when no measure is taken, the bulging portion 13 comes into contact with the foot of the wearer at the time of wearing, and thus, the peripheral wall portion 12 of the portion where the bulging portion 13 is provided rises, thereby hindering the compressive deformation of the bulging portion 13 described above, which may cause deterioration in fit. Particularly, at the time of high-strength exercise, the shell 10 is deformed along with the movement of the foot of the wearer (so-called foot bending motion or the like), and thus, the rise is more likely to occur in the peripheral wall portion 12 at the portion where the bulging portion 13 is provided, and as a result, the compressive deformation of the bulging portion 13 may not occur at all.

In this regard, as described above, by adopting the configuration in which the bulging portion 13 is covered with the cover portion 14 as a hard-deformable portion, the cover portion 14 functions as a pressing portion, and thus, the bulging portion 13 comes into close contact with the foot of the wearer not only during low-strength exercise but also during high-strength exercise, and as a result, appropriate compressive deformation occurs in the bulging portion 13. Therefore, the fit of the bulging portion 13 with respect to the surface of the above-described recessed portion of the foot of the wearer can be maintained, and thus, not only the stationary fit in the portion but also the dynamic fit in the portion can be secured.

Therefore, by adopting the shoe 1A according to the present embodiment, it is possible to improve the stationary fit and the dynamic fit in the shoe including the flexible shell 10 made of the elastic material. Particularly, the rear end portion of the shoe 1A provided with the medial foot side bulging portion 13A and the lateral foot side bulging portion 13B described above is a portion that, in a case where the fit is poor, causes the foot of the wearer to move to the front, back, left, and right inside the shoe, thereby causing fatigue or foot injury to the wearer, and is a portion that causes the shoe to fall off from the foot of the wearer, and thus, the effect of the shoe 1A is highly significant.

In addition, in the shoe 1A according to the present embodiment, as described above, the medial foot side bulging portion 13A and the lateral foot side bulging portion 13B are provided in the shell 10, and thus, it is easy to maintain the state in which the medial foot side bulging portion 13A and the lateral foot side bulging portion 13B are in contact with the recess of the portion located behind the malleolus of the peripheral surface of the foot of the wearer not only at the time of being stationary but also at the time of walking or running. Therefore, even when the foot moves (bending motion or the like), a gap between the shoe 1A and the recess in the portion located behind the malleolus of the peripheral surface of the foot of the wearer is less likely to occur, and it is possible to provide a comfortable shoe capable of suppressing the occurrence of shoe rubbing.

In addition, in the shoe 1A according to the present embodiment, almost the entire shell 10 is formed of the three-dimensional mesh structure body, but as described above, particularly, the medial foot side bulging portion 13A and the lateral foot side bulging portion 13B are each formed of the three-dimensional mesh structure body, and thus, the ventilation in the portion is improved, and as a result, the accumulation of frictional heat in the portion, which may cause shoe rubbing, can also be reduced, thereby further contributing to the provision of a comfortable shoe.

Here, since both the medial foot side bulging portion 13A and the lateral foot side bulging portion 13B are covered with the side wall portion 22 of the upper body 20, even in a case of adopting the above configuration, the foot contact is not deteriorated, and a shoe with excellent wearing comfort can be obtained. And even in a case where the medial foot side bulging portion 13A and the lateral foot side bulging portion 13B are exposed without being covered with the upper body 20, the wearing comfort is not extremely lowered.

The medial foot side cover portion 14A and the lateral foot side cover portion 14B are not necessarily each formed of a solid structure, and may be each formed of a porous structure having voids therein as long as the medial foot side cover portion 14A and the lateral foot side cover portion 14B have higher rigidity than the medial foot side bulging portion 13A and the lateral foot side bulging portion 13B. That is, as long as the medial foot side cover portion 14A and the lateral foot side cover portion 14B are configured to have higher rigidity than the medial foot side bulging portion 13A and the lateral foot side bulging portion 13B, respectively, it is possible to provide a shoe in which the stationary fit and the dynamic fit of the shell 10 with respect to the foot are improved at the position behind the malleolus of the foot of the wearer.

(First to Fifth Modifications)

FIGS. 8 to 12 are schematic cross-sectional views of a main portion of a shell included in shoes according to the first to fifth modifications, respectively. Hereinafter, shoes 1A1 to 1A5 according to the first to fifth modifications based on the present embodiment will be described with reference to FIGS. 8 to 12. The shoes 1A1 to 1A5 according to the first to fifth modifications are different from the shoe 1A according to Embodiment 1 described above only in the configurations of the medial foot side cover portion 14A and the lateral foot side cover portion 14B provided on the shell 10.

The medial foot side cover portion 14A and the lateral foot side cover portion 14B will also be described here without being distinguished from each other.

Figure 8:
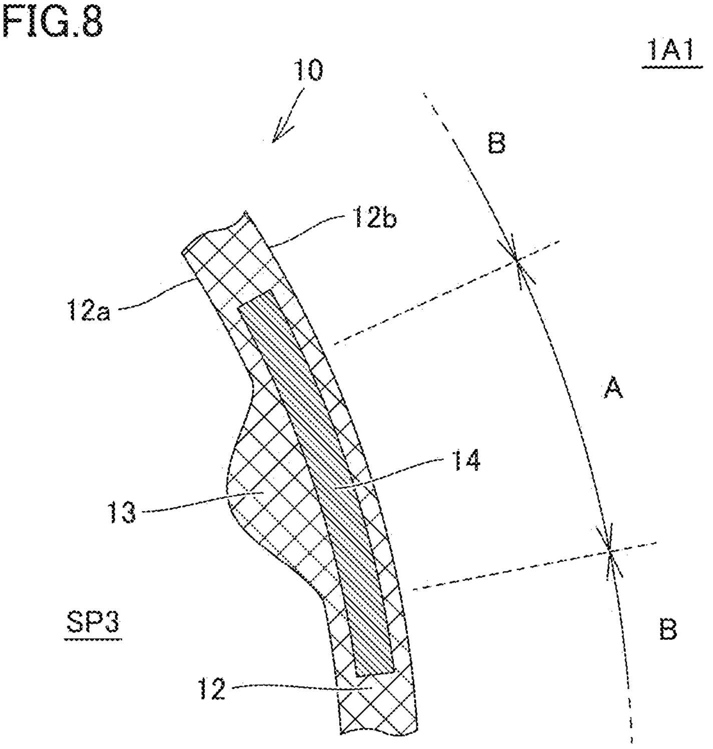
FIG. 8 is a schematic cross-sectional view of a main portion of a shell included in a shoe according to a first modification.

As illustrated in FIG. 8, in the shoe 1A1 according to the first modification, the cover portion 14 is embedded in the peripheral wall portion 12, and thus, the cover portion 14 is disposed on the side opposite to the side where the insertion space SP3 is located when viewed from the bulging portion 13. Accordingly, the end surface of the cover portion 14 located on the insertion space SP3 side is covered with the three-dimensional mesh structure body constituting the peripheral wall portion 12, and the end surface of the cover portion 14 located on the side opposite to the insertion space SP3 is also covered with the three-dimensional mesh structure body constituting the peripheral wall portion 12.

Figure 9:
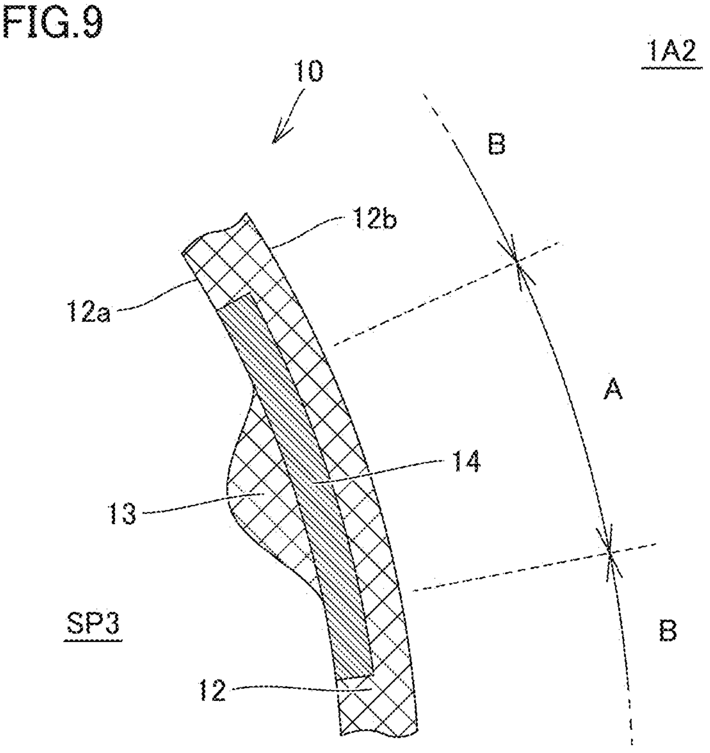
FIG. 9 is a schematic cross-sectional view of a main portion of a shell included in a shoe according to a second modification.

As illustrated in FIG. 9, in the shoe 1A2 according to the second modification, a portion of the cover portion 14 is embedded in the peripheral wall portion 12, and the remaining portion of the cover portion 14 is located on the inner surface (that is, the inner peripheral surface 12*a*) of the peripheral wall portion 12, and thus, the cover portion 14 is disposed on the side opposite to the side where the insertion space SP3 is located as viewed from the bulging portion 13. Accordingly, the portion corresponding to the bulging portion forming region A of the end surface of the cover portion 14 located on the insertion space SP3 side is covered with the three-dimensional mesh structure body constituting the bulging portion 13, the portion corresponding to the adjacent region B of the end surface of the cover portion 14 located on the insertion space SP3 side is exposed on the inner peripheral surface 12*a* of the peripheral wall portion 12, and the end surface of the cover portion 14 located on the side opposite to the insertion space SP3 is covered with the three-dimensional mesh structure body constituting the peripheral wall portion 12.

Figure 10:
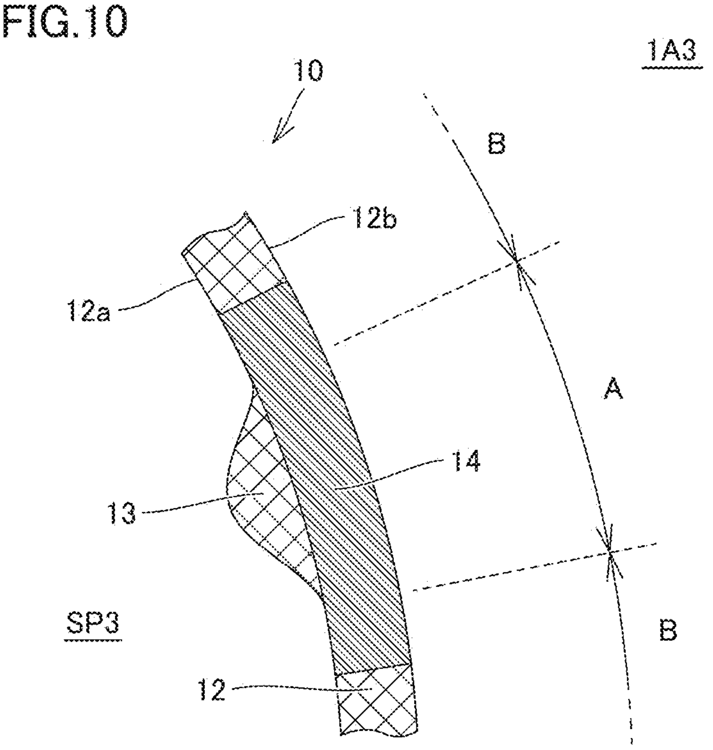
FIG. 10 is a schematic cross-sectional view of a main portion of a shell included in a shoe according to a third modification.

As illustrated in FIG. 10, in the shoe 1A3 according to the third modification, a portion of the portion corresponding to the bulging portion forming region A excluding the bulging portion 13 is configured as the cover portion 14, and a portion of the adjacent region B located in the immediate vicinity of the bulging portion forming region A is configured as the cover portion 14, and thus, the cover portion 14 is disposed on the side opposite to the side where the insertion space SP3 is located as viewed from the bulging portion 13. Accordingly, the portion corresponding to the bulging portion forming region A of the end surface of the cover portion 14 located on the insertion space SP3 side is covered with the three-dimensional mesh structure body constituting the bulging portion 13, the portion corresponding to the adjacent region B of the end surface of the cover portion 14 located on the insertion space SP3 side is exposed on the inner peripheral surface 12*a* of the peripheral wall portion 12, and the end surface of the cover portion 14 located on the side opposite to the insertion space SP3 is exposed on the outer peripheral surface 12*b* of the peripheral wall portion 12. Note that the cover portion 14 provided in the adjacent region B may be configured in a manner that the cover portion 14 is interrupted halfway by providing the cover portion 14 only in a portion located in the immediate vicinity of the bulging portion forming region A as described above, but the cover portion 14 may be provided over the entire adjacent region B.

Figure 11:
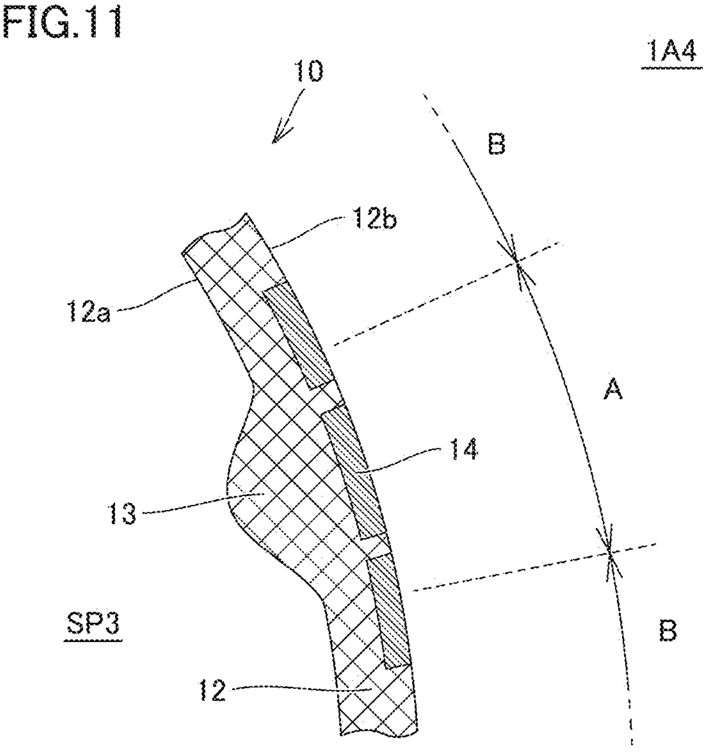
FIG. 11 is a schematic cross-sectional view of a main portion of a shell included in a shoe according to a fourth modification.

As illustrated in FIG. 11, in the shoe 1A4 according to the fourth modification, the cover portion 14 is formed of a plurality of divided bodies. Each of the cover portions 14 including the plurality of divided bodies is located on the outer surface (that is, the outer peripheral surface 12*b*) of the peripheral wall portion 12, whereby each of the cover portions 14 is disposed on the side opposite to the side where the insertion space SP3 is located when viewed from the bulging portion 13. Accordingly, the end surface of each of the cover portions 14 located on the insertion space SP3 side is covered with the three-dimensional mesh structure body constituting the peripheral wall portion 12, and the end surface of each of the cover portions 14 located on the side opposite to the insertion space SP3 is exposed on the outer peripheral surface 12*b* of the peripheral wall portion 12.

Figure 12:
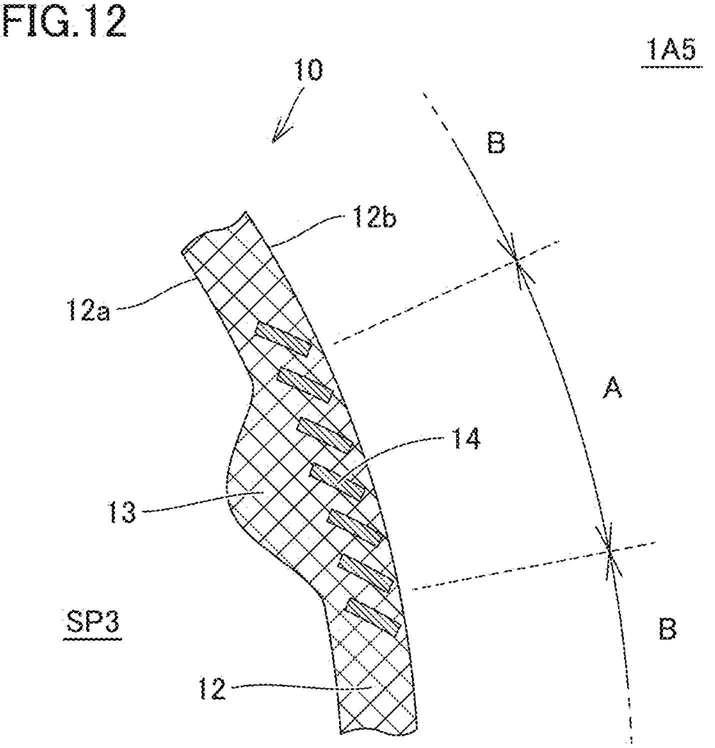
FIG. 12 is a schematic cross-sectional view of a main portion of a shell included in a shoe according to a fifth modification.

As illustrated in FIG. 12, in the shoe 1A5 according to the fifth modification, the cover portion 14 is formed of a plurality of divided bodies. Each of the cover portions 14 including the plurality of divided bodies is embedded in the peripheral wall portion 12, whereby each of the cover portions 14 is disposed on the side opposite to the side where the insertion space SP3 is located when viewed from the bulging portion 13. In addition, each of the cover portions 14 is disposed to be inclined inside the peripheral wall portion 12 in a manner that portions thereof are disposed to face each other. Accordingly, the entire cover portion 14 is covered with the three-dimensional mesh structure body constituting the peripheral wall portion 12.

Even in the case of configuring as in the first to fifth modifications, the same effect as in the case of Embodiment 1 described above can be obtained, and in a shoe including the flexible shell 10 made of an elastic material, it is possible to improve stationary fit and dynamic fit.

In order to enhance the rigidity of the cover portion 14, a spot-shaped or rib-shaped protrusion may be provided on the surface of the cover portion 14. In this case, the protrusion may be provided on a surface of a portion of the cover portion 14 exposed to the outside, or may be provided on a portion of the cover portion 14 covered with the three-dimensional mesh structure body.

Embodiment 2

Figure 13:
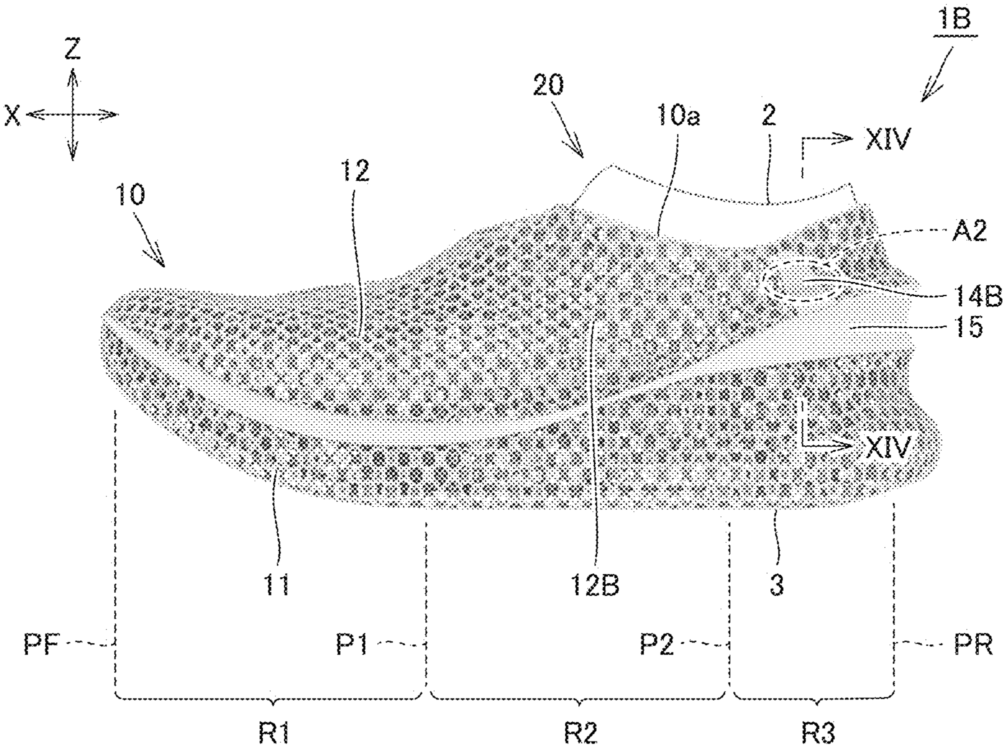
FIG. 13 is a side view of a shoe according to Embodiment 2 as viewed from a lateral foot side.
Figure 14:
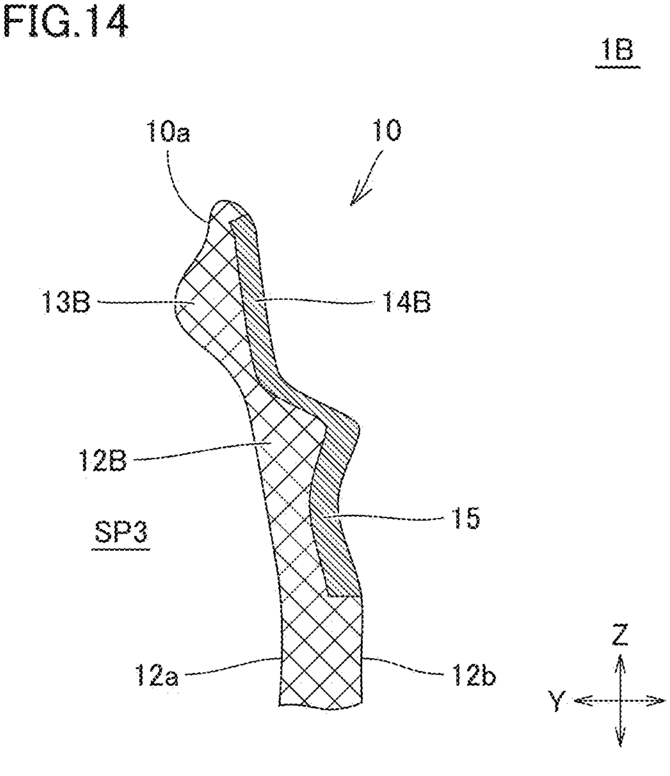
FIG. 14 is a schematic cross-sectional view of a shell included in the shoe illustrated in FIG. 13 taken along line XIV-XIV illustrated in FIG. 13.

FIG. 13 is a side view of the shoe according to Embodiment 2 as viewed from the lateral foot side, and FIG. 14 is a schematic cross-sectional view of a shell included in the shoe illustrated in FIG. 13, taken along line XIV-XIV illustrated in FIG. 13. Hereinafter, the shoe 1B according to Embodiment 2 will be described with reference to FIGS. 13 and 14. The shoe 1B according to Embodiment 2 is different from the shoe 1A according to Embodiment 1 described above mainly in the configurations of the medial foot side cover portion 14A and the lateral foot side cover portion 14B provided in the shell 10. Here, in FIGS. 13 and 14, only the lateral foot side cover portion 14B appears, and hereinafter, the description will be given focusing on the lateral foot side cover portion 14B, but the medial foot side cover portion 14A has the same configuration.

As illustrated in FIG. 13, in the shoe 1B according to the present embodiment, the lateral foot side cover portion 14B is provided in a portion (that is, a portion indicated by a reference sign A2 in FIG. 13) of the lateral foot side peripheral wall portion 12B where the lateral foot side bulging portion 13B is provided, and a highly rigid portion 15 is provided at a position lower than the portion of the lateral foot side peripheral wall portion 12B in the up-down direction Z. The highly rigid portion 15 is formed of a solid structure, and has a belt-like shape extending from the front end to the rear end of the shoe 1B in the front-rear direction X.

The highly rigid portion 15 is a portion for enhancing the bending rigidity of the lateral foot side peripheral wall portion 12B (particularly, a portion of the lateral foot side peripheral wall portion 12B where the lateral foot side bulging portion 13B is provided). That is, the highly rigid portion 15 formed of a solid structure has a high occupied volume ratio per unit volume and accordingly has a high density, and thus functions as a hard-deformable portion. Therefore, not only at the time of the low-strength exercise but also at the time of the high-strength exercise, the highly rigid portion 15 suppresses the outward (that is, toward the side opposite to the insertion space SP3) collapse of the lateral foot side peripheral wall portion 12B along with the movement of the foot of the wearer (so-called foot bending motion or the like).

Therefore, since the above-described collapse of the lateral foot side peripheral wall portion 12B can be suppressed, the lateral foot side bulging portion 13B can be prevented from separating from the surface of the foot of the wearer, and as a result, the fit of the lateral foot side bulging portion 13B with respect to the surface of the above-described recessed portion of the foot of the wearer can be maintained, and the dynamic fit in the portion is improved.

Here, as illustrated in FIGS. 13 and 14, in the present embodiment, the highly rigid portion 15 and the lateral foot side cover portion 14B described above are each formed of a solid structure, and thus, they are configured to be connected on the peripheral wall portion 12. In other words, by branching a portion of the highly rigid portion 15 and extending the branched portion to reach the portion indicated by the reference sign A1 described above, the branched portion of the highly rigid portion 15 forms the lateral foot side cover portion 14B.

In the case of such a configuration, not only the same effect as the effect described in Embodiment 1 described above can be obtained, but also the dynamic fit can be further improved in the shoe including the flexible shell 10 made of the elastic material.

In addition, by providing the shoe 1B according to the present embodiment, the highly rigid portion 15 is provided in a manner of extending from the front end to the rear end of the shoe 1B, and thus, it is possible to enhance the bending rigidity of the medial foot side peripheral wall portion 12A and the lateral foot side peripheral wall portion 12B over the entire shoe 1B in the front-rear direction X as well as the bending rigidity of the rear end side portion of the shoe 1B where the medial foot side bulging portion 13A and the lateral foot side bulging portion 13B are provided, and it is possible not only to enhance the dynamic fit but also to suppress excessive pronation at the time of foot landing.

Here, in the shoe 1B according to the present embodiment, the highly rigid portion 15 is provided in a manner of being inclined downward toward the front side in the front-rear direction X of the shoe 1B. With such a configuration, in the forefoot portion R1 and the midfoot portion R2, the highly rigid portion 15 is disposed at a position closer to the lower end in the up-down direction Z of the insertion space SP3 described above as compared with the rearfoot portion R3.

By providing the highly rigid portion 15 at the position closer to the lower end in the up-down direction Z of the insertion space SP3 in this manner, the above-described collapse of the peripheral wall portion 12 can be suppressed from a position on the lower side in the up-down direction Z as compared with the case where the highly rigid portion 15 is provided at a position on the upper side in the up-down direction Z.

Therefore, with such a configuration, the collapse of the peripheral wall portion can be more reliably suppressed not only in the forefoot portion R1 and the midfoot portion R2 but also in the rearfoot portion R3. Therefore, particularly, in the forefoot portion R1 and the midfoot portion R2, the stability at the time of foot landing is improved, and in the rearfoot portion R3, in addition to the stability at the time of foot landing, excessive pronation at the time of foot landing can be suppressed.

Note that, in a case where the highly rigid portion 15 is provided at a position further below the lower end in the up-down direction Z of the insertion space SP3 described above, the starting point of the collapse of the peripheral wall portion of the shell 10 moves to a position further below the sole of the wearer, and the collapse of the peripheral wall portion 12 is likely to occur conversely. Therefore, the lower limit of the position where the highly rigid portion 15 is provided is desirably a position corresponding to the lower end in the up-down direction Z of the insertion space SP3.

In addition, by providing the highly rigid portion 15 at the forefoot portion R1 (particularly, the front end of the shoe 1B), the rigidity of the shell 10 at the toe portion is improved, and thus, the wear resistance of the shell 10 is improved, and as a result, the durability of the shoe 1B can be increased.

Note that the highly rigid portion 15 may be provided in a manner of extending from the front end to the rear end of the shoe 1B as described above, and may be provided only in a portion on the rear end side in the front-rear direction X of the shoe 1B. When configured in such a manner, it is also possible to further improve the dynamic fit.

Embodiment 3

Figure 15:
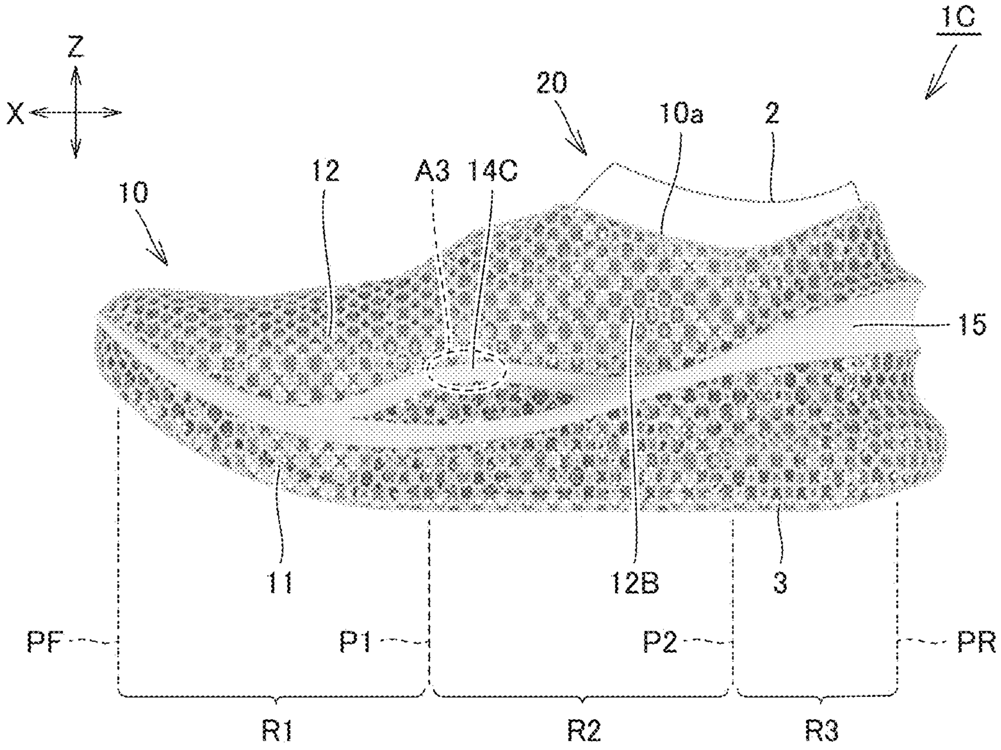
FIG. 15 is a side view of a shoe according to Embodiment 3 as viewed from a lateral foot side.

FIG. 15 is a side view of a shoe according to Embodiment 3 as viewed from a lateral foot side. Below, with reference to FIG. 15, a shoe 1C according to Embodiment 3 will be described. The shoe 1C according to Embodiment 3 is different from the shoe 1B according to Embodiment 2 described above only in the configuration of the shell 10.

The shoe 1C according to the present embodiment is different from the shoe 1B according to Embodiment 2 described above in that a bulging portion is provided in the peripheral wall portion 12 of the shell 10 at a portion corresponding to the instep of the foot of the wearer. More specifically, as illustrated in FIG. 15, in the shoe 1C, a bulging portion (not illustrated in FIG. 15) formed of a three-dimensional mesh structure body as an easy-deformable portion bulging toward the insertion space SP3 is provided at one position corresponding to a recessed portion located on the surface of the instep of the foot of the wearer (a region indicated by a reference sign A3 in FIG. 15 corresponds to the position corresponding to the recessed portion located on the surface of the instep of the foot of the wearer) of the peripheral wall portion 12 of the shell 10.

Furthermore, in the shoe 1C according to the present embodiment, similarly to the shoe 1B according to Embodiment 2 described above, the highly rigid portion 15 formed of a solid structure having a belt-like shape extending from the front end to the rear end of the shoe 1C in the front-rear direction X is provided. Here, unlike the shoe 1B according to Embodiment 2 described above, the highly rigid portion 15 does not have a portion branched to reach the portion indicated by the reference sign A1 described above (see FIG. 13), and instead, has a portion branched to reach the portion indicated by the reference sign A3 described above. The highly rigid portion 15 of the portion branched to reach the reference sign A3 forms a cover portion 14C.

When configured in such a manner, in the shoe including the flexible shell 10 made of the elastic material, the stationary fit and the dynamic fit are improved, and particularly, the fit at the position corresponding to the instep of the wearer is improved.

Embodiment 4

Figure 16:
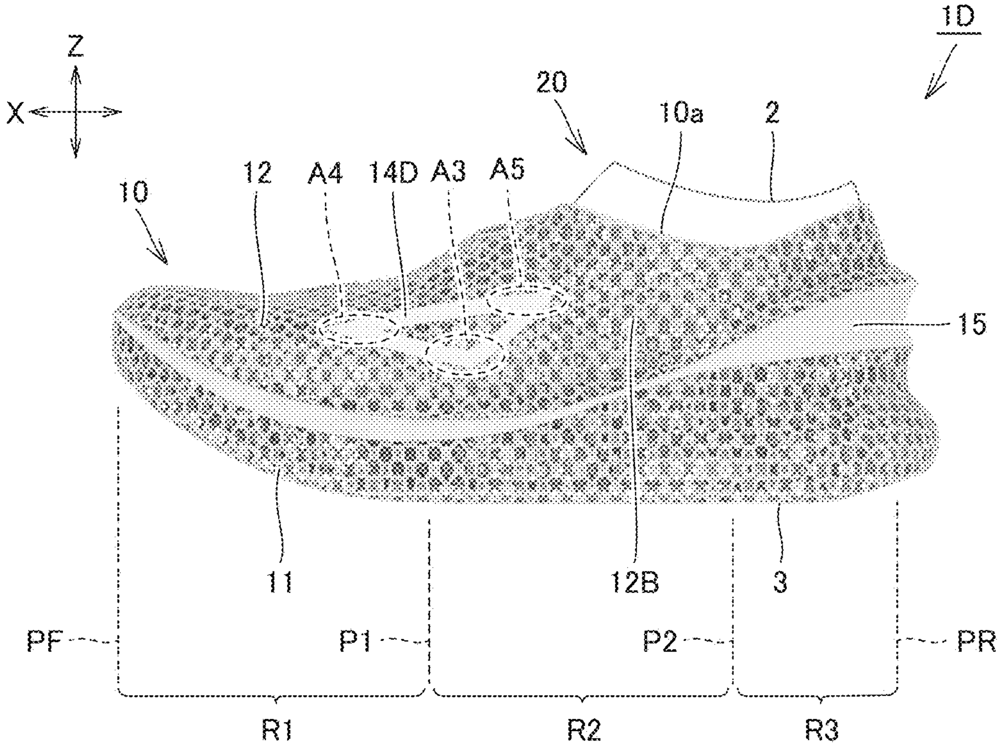
FIG. 16 is a side view of a shoe according to Embodiment 4 as viewed from a lateral foot side.

FIG. 16 is a side view of a shoe according to Embodiment 4 as viewed from a lateral foot side. Below, with reference to FIG. 16, a shoe 1D according to Embodiment 4 will be described. The shoe 1D according to Embodiment 4 is different from the shoe 1B according to Embodiment 2 described above only in the configuration of the shell 10.

The shoe 1D according to the present embodiment is different from the shoe 1B according to Embodiment 1 described above in that a bulging portion is provided in the peripheral wall portion 12 of the shell 10 at a portion corresponding to the instep of the foot of the wearer. More specifically, as illustrated in FIG. 16, in the shoe 1D, bulging portions (not illustrated in FIG. 16) each formed of a three-dimensional mesh structure body as an easy-deformable portion bulging toward the insertion space SP3 are provided at three positions corresponding to recessed portions located on the surface of the instep of the foot of the wearer (regions indicated by reference signs A3 to A5 in FIG. 16 correspond to the positions corresponding to these recessed portions located on the surface of the instep of the foot of the wearer) of the peripheral wall portion 12 of the shell 10.

The portions where these three bulging portions are provided and the peripheral wall portion 12 in the vicinity thereof are provided with a cover portion 14D formed of a solid structure as a hard-deformable portion. The cover portion 14D is not independently provided in association with each of the above-described three bulging portions, and is configured as one cover portion that covers all these three bulging portions.

When configured in such a manner, in the shoe including the flexible shell 10 made of the elastic material, the stationary fit and the dynamic fit are improved, and particularly, the fit at the position corresponding to the instep of the wearer is improved.

Furthermore, in the case of such a configuration, the rigidity of the peripheral wall portion 12 of the shell 10 is enhanced by the cover portion 14D and the highly rigid portion 15 in the portion near the rear end of the forefoot portion R1 and the portion near the front end of the midfoot portion R2, which are portions corresponding to the arch of the foot of the wearer, and thus, it is possible to effectively suppress excessive collapse of the arch of the foot of the wearer. On the other hand, in the portion where the MP joint of the foot of the wearer is located, the cover portion 14D and the highly rigid portion 15 are not configured to be extremely large, and thus, a so-called foot bending motion is not hindered.

Embodiment 5

Figure 17:
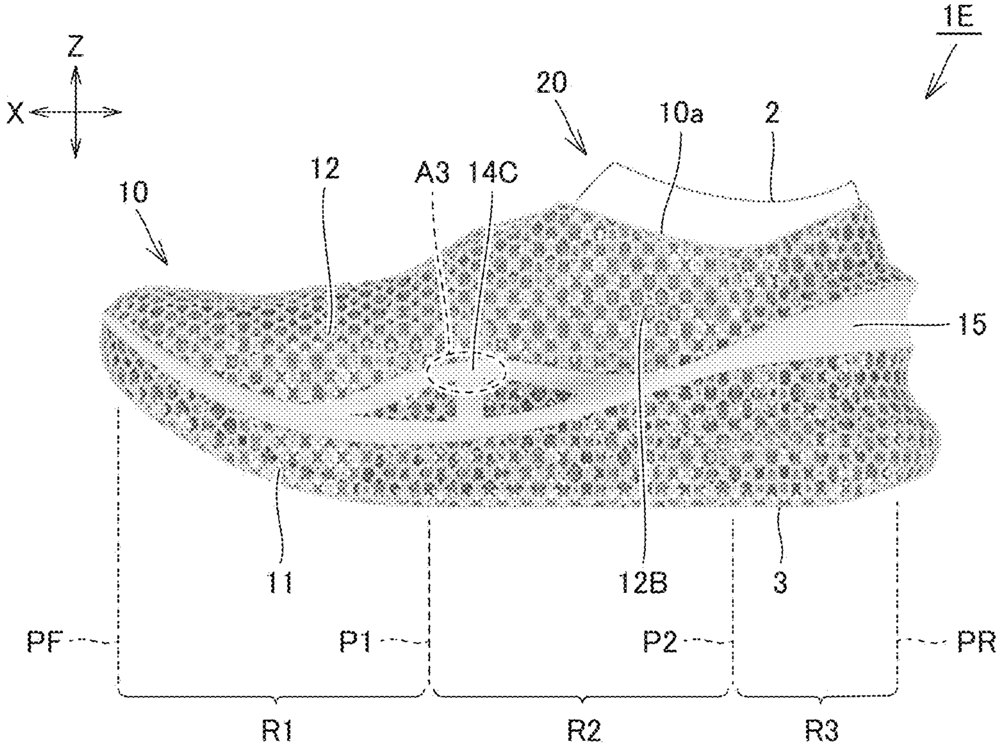
FIG. 17 is a side view of a shoe according to Embodiment 5 as viewed from a lateral foot side.

FIG. 17 is a side view of a shoe according to Embodiment 5 as viewed from a lateral foot side. Below, with reference to FIG. 17, a shoe 1E according to Embodiment 5 will be described. The shoe 1E according to Embodiment 5 is different from the shoe 1C according to Embodiment 3 described above only in the configuration of the shell 10.

As illustrated in FIG. 17, the shoe 1E according to Embodiment 5 is different from the shoe 1C according to Embodiment 3 described above only in the configuration that the cover portion 14C and the highly rigid portion 15 are connected by a rib-shaped portion extending in the up-down direction Z.

When configured in such a manner, in the shoe including the flexible shell 10 made of the elastic material, the stationary fit and the dynamic fit are improved, and particularly, the fit at the position corresponding to the instep of the wearer is improved.

Furthermore, in the case of such a configuration, as compared with the shoe 1C according to Embodiment 3 described above, the cover portion 14C and the highly rigid portion 15 are connected by the rib-shaped portion, thereby the rigidity of the portion of the shell 10 corresponding to the arch of the foot of the wearer can be more effectively enhanced, and thus, the excessive collapse of the arch of the foot of the wearer can be more effectively suppressed.

Embodiment 6

Figure 18:
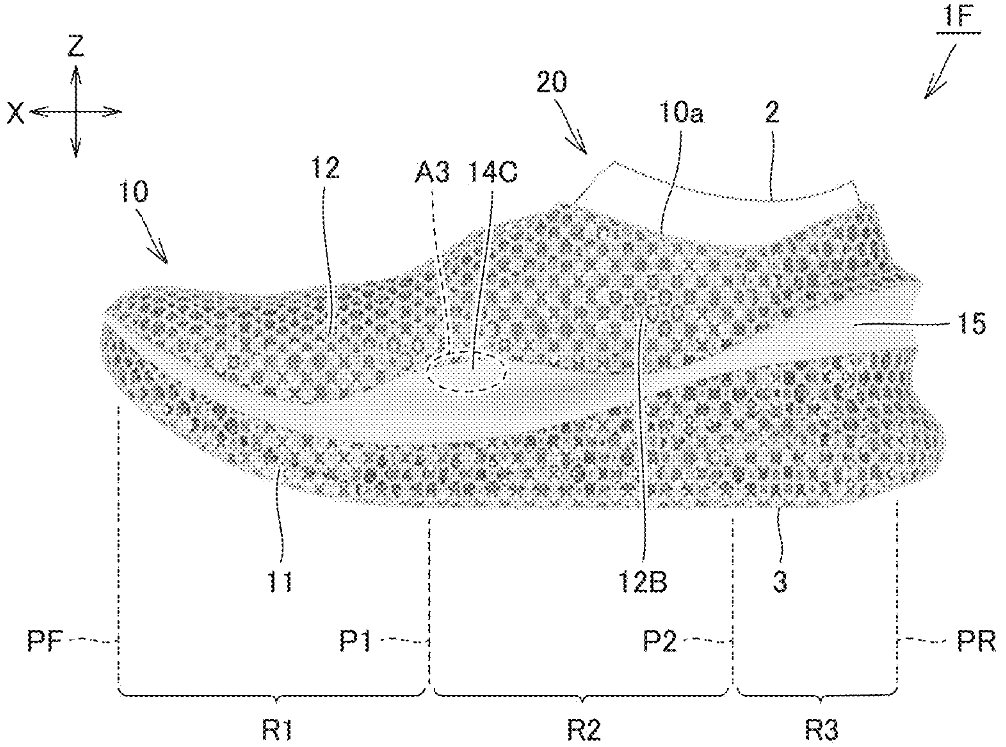
FIG. 18 is a side view of a shoe according to Embodiment 6 as viewed from a lateral foot side.

FIG. 18 is a side view of a shoe according to Embodiment 6 as viewed from a lateral foot side. Below, with reference to FIG. 18, a shoe 1F according to Embodiment 6 will be described. The shoe 1F according to Embodiment 6 is different from the shoe 1C according to Embodiment 3 described above only in the configuration of the shell 10.

As illustrated in FIG. 18, the shoe 1F according to Embodiment 6 is different from the shoe 1C according to Embodiment 3 described above only in the configuration that the cover portion 14C is configured as a portion of the enlarged highly rigid portion 15 by enlarging the width of the highly rigid portion 15.

When configured in such a manner, in the shoe including the flexible shell 10 made of the elastic material, the stationary fit and the dynamic fit are improved, and particularly, the fit at the position corresponding to the instep of the wearer is improved.

Furthermore, in the case of such a configuration, the rigidity of the portion of the shell 10 corresponding to the arch of the foot of the wearer can be more effectively enhanced by enlarging the width of the highly rigid portion 15, and thus, the excessive collapse of the arch of the foot of the wearer can be more effectively suppressed.

Other Aspects, Etc.

In the embodiments and the modifications thereof described above, description has been given by exemplifying the cases where the bulging portions and the cover portions are provided at the portions behind the medial malleolus point and the portions behind the lateral malleolus point of the foot of the wearer, and at the predetermined positions of the instep of the foot of the wearer, of the peripheral wall portion of the shell, but the positions where these bulging portions and cover portions are provided are not limited to these positions. In addition to these, there are various large and small recesses on the surface of the foot, and thus, by providing the bulging portions and the cover portions as described above on the peripheral wall portion of the shell at positions corresponding to these recesses, it is possible to improve the stationary fit and the dynamic fit in the peripheral wall portion.

Here, examples of the recesses existing on the surface of the foot include recesses that depend exclusively on the surface shape of the tarsal, and recesses that occur when the tarsal is not located immediately below the skin and only relatively soft biological tissue is located (for example, recesses that occur in portions located between adjacent tarsals). More specifically, for example, a recess or the like existing on the surface of the foot in the vicinity of the base of the fifth metatarsal bone corresponds to this.

In the embodiments and the modifications thereof described above, description has been given by exemplifying the cases where the bulging portion is entirely formed of a three-dimensional mesh structure body, but as long as at least a portion of the bulging portion includes a portion formed of a three-dimensional mesh structure body, another portion of the bulging portion may be formed of, for example, a solid structure. It is assumed that, as an example of this case, the surface of the bulging portion is covered with a layer formed of a thin solid structure, thereby further improving the foot contact.

In addition, in the embodiments and the modifications thereof described above, description has been given by exemplifying many cases where the bulging portion is entirely covered with the cover portion, but the bulging portion is not necessarily entirely covered with the cover portion, and even when only a portion of the bulging portion is covered with the cover portion, the effect can be obtained accordingly.

In addition, the shape, size, quantity, or the like of the bulging portion, the cover portion, the highly rigid portion, and the like disclosed in the embodiments and the modifications thereof described above can be variously changed without departing from the gist of the present disclosure.

Furthermore, the characteristic configurations illustrated in the embodiments and the modifications thereof described above can be combined with each other without departing from the gist of the present disclosure.

In addition, in the embodiments and the modifications thereof described above, description has been given by exemplifying the cases where the characteristic configurations in the present disclosure are applied to a shoe as an example of footwear, but the characteristic configurations in the present disclosure can be naturally applied to other footwear such as sandals.

Summary of Disclosures in Embodiments, Etc.

The characteristic configurations disclosed in the embodiments and the modifications thereof described above are summarized as follows.

[Supplementary Note 1]

A footwear including: a shell including an insertion space inside the shell and configured to receive a foot of a wearer, the shell being made of an elastic material, and surrounding the insertion space, wherein

- the shell includes a bottom wall portion configured to support a sole of the foot of the wearer, and a peripheral wall portion configured to cover a peripheral surface of the foot of the wearer by standing from a peripheral edge of the bottom wall portion,
- the peripheral wall portion has a first region that includes a bulging portion bulging toward the insertion space, and a second region that is adjacent to the first region,
- the bulging portion includes an easy-deformable portion configured of a three-dimensional mesh structure body,
- the peripheral wall portion includes a cover portion as a hard-deformable portion having higher rigidity than the easy-deformable portion, the cover portion being on a side opposite to a side on which the insertion space is located as viewed from the bulging portion and covering at least a portion of the bulging portion by being across the first region and the second region, and
- at least a portion of the peripheral wall portion including the first region and the second region is configured of a single member.

By adopting the configuration according to Supplementary Note 1, the gap between the recessed portion of the foot of the wearer and the peripheral wall portion of the shell is reduced by the bulging portion at the time of wearing, and the bulging portion is appropriately compressed and deformed since the bulging portion is formed of the three-dimensional mesh structure body, and thus, the stationary fit is improved. In addition, by adopting this configuration, the bulging portion as the easy-deformable portion is covered with the cover portion as the hard-deformable portion, and thus, the cover portion functions as a pressing portion that presses the bulging portion toward the foot of the wearer, thereby enhancing the dynamic fit. Therefore, with such a configuration, it is possible to improve the stationary fit and the dynamic fit in the shoe including the flexible shell made of the elastic material.

[Supplementary Note 2]

The footwear according to Supplementary Note 1, wherein

- a portion of the first region and a portion of the second region are configured as the cover portion, and
- the portion of the first region and the portion of the second region excluding the cover portion are each configured of a three-dimensional mesh structure body.

By adopting the configuration according to Supplementary Note 2, it is possible to promote weight reduction of the shoe while improving the stationary fit and the dynamic fit.

[Supplementary Note 3]

The footwear according to Supplementary Note 2, wherein

- the cover portion is on an outer surface of the peripheral wall portion.

By adopting the configuration according to Supplementary Note 3, it is possible to provide a shoe with more excellent foot contact while improving the stationary fit and the dynamic fit.

[Supplementary Note 4]

The footwear according to Supplementary Note 2, wherein

- the cover portion is embedded in the peripheral wall portion.

By adopting the configuration according to Supplementary Note 4, it is possible to provide a shoe with more excellent foot contact while improving the stationary fit and the dynamic fit.

[Supplementary Note 5]

The footwear according to Supplementary Note 1, wherein

- a portion of the first region excluding the bulging portion and an entirety of the second region are configured as the cover portion.

By adopting the configuration according to Supplementary Note 5, particularly, the function of the cover portion as the pressing portion described above is maximized, and thus, the stationary fit and the dynamic fit can be improved to the greatest extent.

[Supplementary Note 6]

The footwear according to any one of Supplementary Notes 1 to 5, wherein

- the cover portion is configured of a solid structure.

By adopting the configuration according to Supplementary Note 6, the rigidity of the cover portion can be maximized, and thus, the dynamic fit can be more reliably improved.

[Supplementary Note 7]

The footwear according to any one of Supplementary Notes 1 to 6, wherein the shell is configured of a single additively manufactured product which is manufactured by a three-dimensional additive manufacturing method.

By adopting the configuration according to Supplementary Note 7, the entire shell consists of a single component, and thus, the number of components can be reduced and the manufacturing cost can be reduced.

[Supplementary Note 8]

The footwear according to any one of Supplementary Notes 1 to 7, wherein the bottom wall portion has a ground contact surface.

By adopting the configuration according to Supplementary Note 8, it is not necessary to separately provide an outsole, and thus, the number of components can be reduced and the manufacturing cost can be reduced.

[Supplementary Note 9]

The footwear according to any one of Supplementary Notes 1 to 8, further including: an upper body that is in the shell and includes an accommodating portion which is bag-shaped and has an opening portion configured to receive the foot of the wearer, wherein the bulging portion is covered with the upper body.

By adopting the configuration according to Supplementary Note 9, it is possible to provide a shoe with more excellent foot contact while improving the stationary fit and the dynamic fit.

[Supplementary Note 10]

The footwear according to any one of Supplementary Notes 1 to 9, further including:

a sole body that is above the bottom wall portion by being in the shell and configured to support a sole of the foot of the wearer in cooperation with the bottom wall portion.

By adopting the configuration according to Supplementary Note 10, it is possible to provide a shoe with excellent cushioning property at the time of foot landing and excellent foot contact while improving the stationary fit and the dynamic fit.

Although the embodiments of the present invention have been described, it should be understood that the embodiments disclosed herein are illustrative and non-restrictive in every respect. The scope of the present invention is defined by claims, and is intended to include all modifications within the scope and meaning equivalent to the claims.

What is claimed is:

1. A footwear comprising: a shell including an insertion space inside the shell and configured to receive a foot of a wearer, the shell being made of an elastic material, and surrounding the insertion space, wherein the shell includes a bottom wall portion configured to support a sole of the foot of the wearer, and a peripheral wall portion configured to cover a peripheral surface of the foot of the wearer, wherein the peripheral wall portion extends upward from a peripheral edge of the bottom wall portion, the peripheral wall portion has a first region that includes a bulging portion bulging toward the insertion space, and a second region that is adjacent to the first region, the bulging portion includes an easy-deformable portion configured as a three-dimensional mesh structure body, the three-dimensional mesh structure being a lattice structure, the peripheral wall portion includes a cover portion as a hard-deformable portion having higher rigidity than the easy-deformable portion, the cover portion being on a side opposite to a side on which the insertion space is located as viewed from the bulging portion and covering at least a portion of the bulging portion by being across the first region and the second region, and at least a portion of the peripheral wall portion including the first region and the second region is configured as a single member.

2. The footwear according to claim 1, wherein the first region and the second region each include:

a first part configured as the cover portion, and a second part configured as a three-dimensional mesh structure body.

3. The footwear according to claim 2, wherein the cover portion is on an outer surface of the peripheral wall portion.

4. The footwear according to claim 2, wherein the cover portion is embedded in the peripheral wall portion.

5. The footwear according to claim 1, wherein a portion of the first region excluding the bulging portion and an entirety of the second region are configured as the cover portion.

6. The footwear according to claim 1, wherein the cover portion is configured as a solid structure.

7. The footwear according to claim 1, wherein the shell is configured as a single additively manufactured product which is manufactured by a three-dimensional additive manufacturing method.

8. The footwear according to claim 1, wherein the bottom wall portion has a ground contact surface.

9. The footwear according to claim 1, further comprising:

an upper body that is in the shell and includes an accommodating portion which is bag-shaped and has an opening portion configured to receive the foot of the wearer, wherein the bulging portion is covered with the upper body.

10. The footwear according to claim 1, further comprising:

a sole body that is above the bottom wall portion by being in the shell and configured to support the sole of the foot of the wearer in cooperation with the bottom wall portion.

* * * * *